United States Patent
Karp et al.

(10) Patent No.: US 12,174,874 B1
(45) Date of Patent: Dec. 24, 2024

(54) SYSTEMS AND METHODS FOR AUTOMATED PROTOTYPING OF A TOPIC MODEL

(71) Applicant: Wells Fargo Bank, N.A., San Francisco, CA (US)

(72) Inventors: Brian Karp, Charlotte, NC (US); William Thompson, Chicago, IL (US); Antonio Iniguez, Phoenix, AZ (US); James Ma, Charlotte, NC (US); Kelley Impoco, Charlotte, NC (US); Richard Penfil, II, San Antonio, TX (US)

(73) Assignee: Wells Fargo Bank, N.A., San Francisco, CA (US)

( * ) Notice: Subject to any disclaimer, the term of this patent is extended or adjusted under 35 U.S.C. 154(b) by 743 days.

(21) Appl. No.: 17/153,540

(22) Filed: Jan. 20, 2021

(51) Int. Cl.
  *G06F 16/35* (2019.01)
  *G06F 16/31* (2019.01)
  *G06F 18/214* (2023.01)
  *G06F 40/284* (2020.01)

(52) U.S. Cl.
  CPC .......... *G06F 16/355* (2019.01); *G06F 16/313* (2019.01); *G06F 18/2148* (2023.01); *G06F 40/284* (2020.01)

(58) Field of Classification Search
  CPC .. G06F 16/355; G06F 16/313; G06F 18/2148; G06F 40/284
  USPC .............................................................. 704/9
  See application file for complete search history.

(56) References Cited

U.S. PATENT DOCUMENTS

| | | | |
|---|---|---|---|
| 2017/0075991 A1* | 3/2017 | Kataria | G06N 7/01 |
| 2021/0375280 A1* | 12/2021 | Wang | G10L 15/16 |

\* cited by examiner

*Primary Examiner* — Thierry L Pham
(74) *Attorney, Agent, or Firm* — K&L Gates LLP

(57) ABSTRACT

Systems, apparatuses, methods, and computer program products are disclosed for automated prototyping of a topic model. An example method includes a data manipulation engine ingesting and pre-processing source data from a set of data sources, a feature extraction engine that thereafter transforms the pre-processed data into a set of numeric representations of the pre-processed data, and an autonomous model generator that automatically generates a trained topic model using the set of numeric representations. Embodiments further enable visualization of topic model output, which permits a user to easily consume and utilize information from a topic model for any number of purposes.

20 Claims, 9 Drawing Sheets

SYSTEMS AND METHODS FOR AUTOMATED PROTOTYPING OF A TOPIC MODEL

TECHNOLOGICAL FIELD

Example embodiments of the present disclosure relate generally to machine learning and, more particularly, to systems and methods for automated prototyping of a topic model.

BACKGROUND

With more and more types of activity being digitized and recorded, and with storage space no longer a bottleneck, the amount of written documentation available for inspection has grown significantly over time. This fact presents both a blessing and a curse. On the one hand, with an increasingly large amount of written material, there is the potential to gain generalized insight about that material from broad-based analysis. On the other hand, the time and resources required to generate those insights grows as well, and such analysis is becoming increasingly difficult to perform using traditional manual processes. Topic modeling is an unsupervised machine learning technique designed to examine large sets of documents and provide generalized thematic insight about them. Specifically, a topic model ingests a set of documents and attempts to produce clusters of similar words appearing in the set of documents.

BRIEF SUMMARY

Several barriers exist preventing greater application of topic modeling in the real-world settings that confront individuals and businesses, which are described in greater detail below. At a high level, existing tools provide only a patchwork of functionalities, and deep expertise and manual effort is required to prototype topic models. As a result, topic modeling requires deep expertise that is often not available in the various domains that may benefit from its use. Moreover, because of the significant manual effort required using traditional techniques, there is a lack of consistency or rigor to the application of topic modeling, and the training of topic models takes a long time. Both of these issues prevent application of topic modeling in environments requiring analytical consistency and rigor (such as highly regulated industries) or where topic modeling solutions must be developed fast to retain their relevance. Finally, there is a need for better tools to visualize the output of topic models.

Solutions are provided herein that address these issues, and others. As described below, systems, apparatuses, methods, and computer program products are disclosed herein for automated prototyping of a topic model. Through the use of a topic modeling system as described herein, users are provided with a standardized yet extensible pipeline for automatically generating prototype topic models for a given domain. The solutions described herein offer compatibility with popular computational frameworks such as sklearn and genism. Similarly, the solutions are compact, creating the ability to prototype a topic model in as little as a single line of code. Finally, the solutions described herein are extensible, and the framework for topic model prototyping described herein is suitable for extension to other machine learning solutions outside of topic modeling, such as classification and regression.

In an example embodiment, a topic modeling system is provided for prototyping a topic model. The topic modeling system includes a data manipulation engine configured to ingest source data from a set of data sources and pre-process the source data to produce pre-processed data, a feature extraction engine configured to transform the pre-processed data into a set of numeric representations of the pre-processed data, and an autonomous model generator configured to automatically generate a trained topic model using the set of numeric representations. The topic modeling system may further include a data visualizer configured to generate a set of output data using the trained topic model and export the set of output data.

In another example embodiment, a method is provided for prototyping a topic model. The method ingesting, by a data manipulation engine, source data from a set of data sources, pre-processing the source data by the data manipulation engine to produce pre-processed data, transforming, by a feature extraction engine, the pre-processed data into a set of numeric representations of the pre-processed data, and automatically generating, by an autonomous model generator, a trained topic model using the set of numeric representations. The method may further include generating a set of output data using the trained topic model, and exporting the set of output data.

In yet another example embodiment, a computer program product is provided for automated prototyping of a topic model. The computer program product may comprise at least one non-transitory computer-readable storage medium storing software instructions that, when executed, cause a topic modeling system to ingest source data from a set of data sources, pre-process the source data to produce pre-processed data, transform the pre-processed data into a set of numeric representations of the pre-processed data, and automatically generate a trained topic model using the set of numeric representations. The software instructions, when executed, may further cause the topic modeling system to generate a set of output data using the trained topic model and export the set of output data.

Systems, apparatuses, methods, and computer program products are also disclosed herein for utilizing topic model visualization. Through the interactive visualization solutions described herein, a user may easily identify engage with the thematic assessments provided by a prototyped topic model and leverage that insight to iteratively improve the prototyping of a topic model, and/or to more easily understand the insight provided by a topic model so the user can leverage that insight to enhance business operations.

In an example embodiment, a system is provided for utilizing topic model visualization. The system includes a topic modeling system for prototyping a topic model based on a set of documents, a data visualizer for exporting data from the prototyped topic model, generating a graphical user interface for presentation to a user, the graphical user interface depicting a set of discrete graphical elements, and populating the set of discrete graphical elements using the exported data to produce a set of visualizations about the set of documents. The topic modeling system may further be configured to receive user input regarding the set of discrete graphical elements, and the data visualizer may further be configured to re-populate the set of discrete graphical elements in response to receiving the user input regarding the set of discrete graphical elements. The topic modeling system may further be configured to receive user input for customizing a new topic model prototype and prototype a new topic model based on a set of documents and further based on the received user input.

In another example embodiment, a method is provided for utilizing topic model visualization. The method includes prototyping, by a topic modeling system, a topic model based on a set of documents, exporting, by a data visualizer of the topic modeling system, data from the prototyped topic model, generating, by the data visualizer, a graphical user interface for presentation to a user, the graphical user interface depicting a set of discrete graphical elements, and populating, by the data visualizer, the set of discrete graphical elements using the exported data to produce a set of visualizations about the set of documents. The method may further include receiving, by the topic modeling system, user input regarding the set of discrete graphical elements, and re-populating, by the data visualizer, the set of discrete graphical elements in response to receiving the user input regarding the set of discrete graphical elements. In addition, the method may further include receiving, by the topic modeling system, user input for customizing a new topic model prototype, and prototyping, by the topic modeling system, a new topic model based on a set of documents and further based on the received user input.

In yet another example embodiment, a computer program product is provided for automated prototyping of a topic model. The computer program product may comprise at least one non-transitory computer-readable storage medium storing software instructions that, when executed, cause a topic modeling system to prototype a topic model based on a set of documents, export data from the prototyped topic model, generate a graphical user interface for presentation to a user, the graphical user interface depicting a set of discrete graphical elements, and populate the set of discrete graphical elements using the exported data to produce a set of visualizations about the set of documents. The software instructions, when executed, may further cause the topic modeling system to receive user input regarding the set of discrete graphical elements, and re-populate the set of discrete graphical elements in response to receiving the user input regarding the set of discrete graphical elements. The software instructions, when executed, may further cause the topic modeling system to receive user input for customizing a new topic model prototype and prototype a new topic model based on a set of documents and further based on the received user input.

The foregoing brief summary is provided merely for purposes of summarizing example embodiments illustrating some aspects of the present disclosure. Accordingly, it will be appreciated that the above-described embodiments are merely examples and should not be construed to narrow the scope of the present disclosure in any way. It will be appreciated that the scope of the present disclosure encompasses many potential embodiments in addition to those summarized above, some of which will be described in further detail below.

BRIEF DESCRIPTION OF THE FIGURES

Having described certain example embodiments of the present disclosure in general terms above, reference will now be made to the accompanying drawings, which are not necessarily drawn to scale. Some embodiments may include fewer or more components than those shown in the figures.

DETAILED DESCRIPTION

Figure 1:
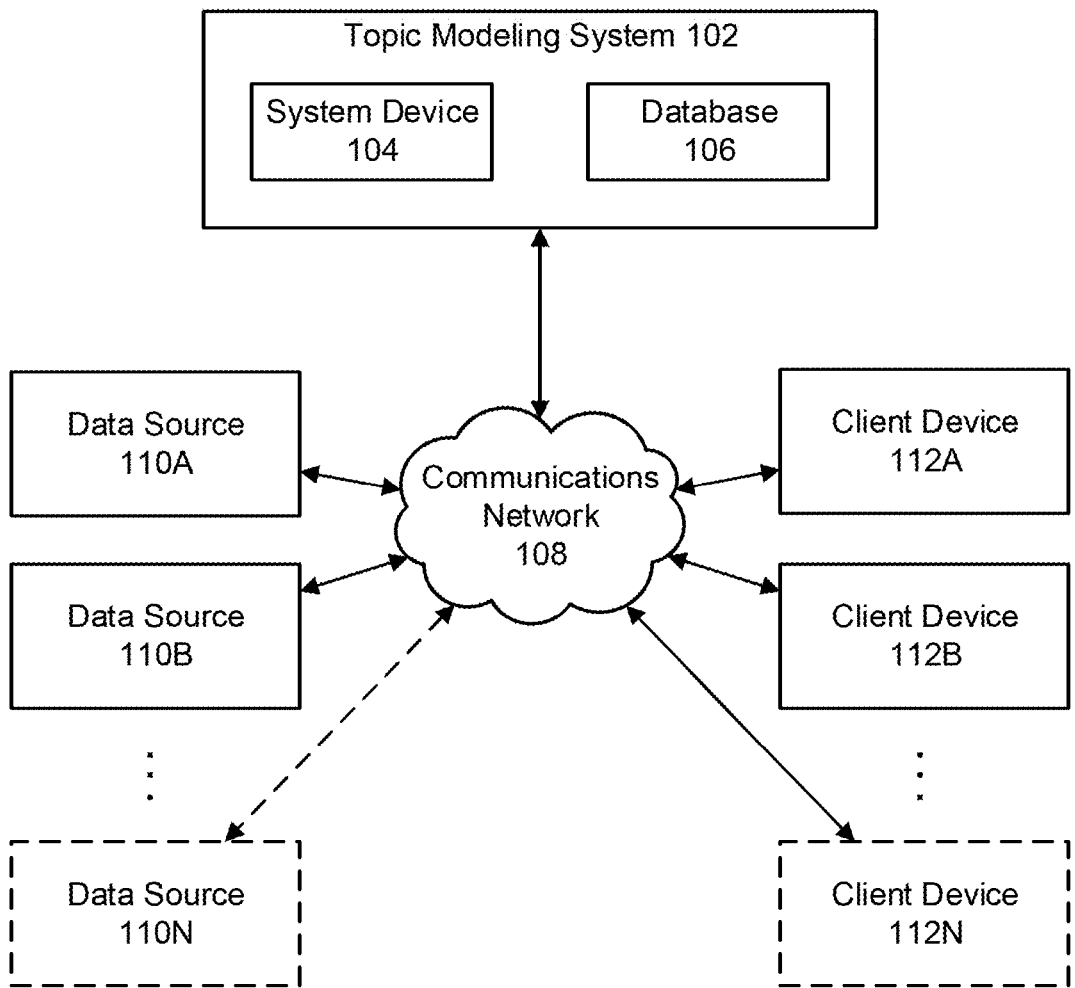
FIG. 1 illustrates a system in which some example embodiments of a topic modeling system may be used.

Some embodiments of the present disclosure will now be described more fully hereinafter with reference to the accompanying figures, in which some, but not all embodiments of the disclosures are shown. Indeed, these disclosures may be embodied in many different forms and should not be construed as limited to the embodiments set forth herein; rather, these embodiments are provided so that this disclosure will satisfy applicable legal requirements.

The term "computing device" is used herein to refer to any one or all of programmable logic controllers (PLCs), programmable automation controllers (PACs), industrial computers, desktop computers, personal data assistants (PDAs), laptop computers, tablet computers, smart books, palm-top computers, personal computers, smartphones, wearable devices (such as headsets, smartwatches, or the like), and similar electronic devices equipped with at least a processor and any other physical components necessarily to perform the various operations described herein. Devices such as smartphones, laptop computers, tablet computers, and wearable devices are generally collectively referred to as mobile devices.

The term "server" or "server device" is used to refer to any computing device capable of functioning as a server, such as a master exchange server, web server, mail server, document server, or any other type of server. A server may be a dedicated computing device or a server module (e.g., an application) hosted by a computing device that causes the computing device to operate as a server.

Overview

As noted above, methods, apparatuses, systems, and computer program products are described herein that provide for automated prototyping of topic models. For a variety of reasons, it has traditionally been very difficult to develop topic models suitable for application to real-world problems.

As an initial matter, traditional tools for topic model development require developers with significant relevant expertise in model generation, and it is difficult to find individuals with this expertise, let alone individuals with this expertise and the domain-specific knowledge necessary for generation of topic models for real-world problems. Thus, an underlying technical problem that has yet to be overcome is the historical inability to design an end-to-end solution that can automate various complicated steps involved in topic model development to lower the barrier-to-entry that exists today.

In this vein, using current tools for developing topic models has historically required a great deal of manual effort. For instance, while tools exist to build a pre-processing pipeline or to collect experimental results on specific technology platforms, these features are fragmented across a few different packages, and vary in terms of customizability, technology dependence, and modeling scope. Further, no such packages are known that offer support for unsupervised learning techniques such as topic modeling. The current state of affairs thus introduces many opportunities for variability in the design of topic models. While inconsistency of design may not be a problem for every use case, design variability can present significant obstacles to adoption of topic modeling in high-regulated areas or in domains where consistency of implementation is of paramount importance. Moreover, avoidance of manual steps in any process avoids operational risk by reducing the likelihood of human error. Accordingly, another technical problem solved by solutions described herein is the need for a holistic—and interoperable—package of functionalities enabling consistent and repeatable end-to-end topic model development.

Furthermore, a function of the issues noted above is that developing a topic model using traditional techniques requires a significant investment of time, and that delay can render topic modeling unsuitable for many use cases having time sensitivity. Similarly, when topic model prototyping takes a long time, iterative prototyping of a topic model is often impossible. Thus, to utilize topic models in time-sensitive situations, and to unlock the ability to iteratively prototype topic models, a technical solution is required that enables prototyping of a topic model more quickly than is possible using historical solutions.

In contrast to these conventional techniques for prototyping topic models, the present disclosure describes systems, apparatuses, methods, and computer program products for automated prototyping of a topic model in ways that avoid the need for a user to possess significant model development expertise, offers greater consistency, and that can develop usable topic models in far less time than required for traditional approaches. Moreover, solutions described herein provide additional benefits, such as ease-of-use, customizability and extensibility of design, implementation compactness, and compatibility with popular computational frameworks such as sklearn and gensim.

Systems described herein provide a suite of functionality to automate data ingestion, data pre-processing, feature extraction, and topic model generation and optimization. Furthermore, solutions described herein further enable visualization of a prototyped topic model, both to enable utilization of the topic model in a production environment (such as by exploring themes across large volumes of data and undertaking more effective decision-making), or to identify ways to iteratively improve upon the topic model ways to enhance the topic model or to utilize the topic model.

Automating the data ingestion and pre-processing operations in topic model development as described in example solutions set forth herein enhances the speed of topic model prototyping and eliminates a significant amount of the manual labor traditionally associated with prototyping topic models. To this end, a data manipulation engine (such as data manipulation engine 210, shown in FIG. 2 and described below) provides a robust and standardized set of operations for data ingestion and pre-processing, while also leaving open the opportunity for customization and extensibility.

To perform data ingestion, the data manipulation engine receives input regarding data to be ingested (such as a location of the data, columns and tables of interest, variables of interest (such as date ranges along with any other conditional statements on data), or the like) and automatically produces a data iterator object (or a set of data) that may be utilized by downstream operations for prototyping a topic model. The data manipulation engine is further designed to operate in an extensible manner compatible with popular packages such as sklearn and gensim. The data manipulation engine may further perform additional operations during ingestion of data, such as preliminary data validation to ensure that the data ingested meets minimum criteria for modeling. The data iterator object generated by the data manipulation engine produces data in a manner consumable by the remainder of the functions of the model generation pipeline. The iterator object may, for instance, generate minibatch DataFrames, which can be used for minibatch training of topic models, which in turn may enhance performance over other approaches.

To pre-process the ingested data, the data manipulation engine performs one or more of a series of pre-processing operations on the ingested data designed to cleanse the raw corpus in a manner that enhances the efficacy of model training. The data manipulation engine may, for instance, receive the iterator object generated in the data ingestion operations, and perform a number of cleansing operations (e.g., lower-case, white space, and non-alphanumeric correction, HTML tag removal, misspelling corrections, or the like), and then produce an output to be consumed by downstream operations in the topic model prototyping procedure. The pre-processing operations performed by the data manipulation engine may be modified by user preference but may, by default, comprise a predefined set of pre-processing operations. The output of the pre-processing performed by the data manipulation engine may comprise a clean data iterator object (similar to the data iterator object produced during data ingestion, but which outputs cleansed data produced by the various pre-processing operations) or it may comprise a table of the cleansed data.

Feature extraction occurs following pre-processing, and includes a feature extraction engine (such as feature extraction engine 212, shown in FIG. 2 and described below) that retrieves the cleansed data and generates a set of numeric representations of the cleansed data. The feature extraction engine may either call a clean data iterator object to retrieve the pre-processed data for feature extraction or may simply receive a table of cleansed data as input. In either case, the feature extraction engine generates a set of numeric representations of the pre-processed data. The numeric representations may be generated through a text vectorization operation or other approach. The numeric representations may then be used by the system in downstream model development operations. In some embodiments, the feature extraction engine may perform a series of initial feature extraction operations (such as lemmatizing words in the pre-processed data, or otherwise refining the pre-processed text to create or modify the series of tokens from which the feature extraction engine generates the numeric representations) to further cleanse the pre-processed data prior to vectorization, although in many embodiments such refining or reduction of pre-processed text will occur as a final stage of pre-processing prior to feature extraction. The output from the feature extraction engine may comprise a feature extraction object that can transform any document it is passed into the desired modeling features (e.g., numeric representations).

An autonomous model generator (such as autonomous model generator 214, shown in FIG. 2 and described below) then uses the numeric representations generated during feature extraction to train a set of topic models and select a topic model from the set of topic models. The set of topic models may be trained using latent direchlet allocation (LDA), hierarchical LDA (hLDA), non-negative matrix factorization (NNMF), another approach for topic modeling, or a combination thereof. Moreover, the set of topic models may be trained using different sets of hyperparameters. To this end, the autonomous model generator 214 may include hyper-parameter tuning functionality to direct pre-processing and feature extraction operations, such as by controlling the size of the vocabulary of words used in feature extraction, selection of TF-IDF, TF, or another vectorization approach is used for generating numeric representations, or the like. The trained models may then be evaluated to identify corresponding metric scores, and the autonomous model generator may then select the trained model having the "best" metric score. The metrics upon which the trained models are scored may be perplexity, log-likelihood, intra-topic similarity, or coherence.

Following selection of a trained topic model, the topic modeling system may then return data produced by the selected topic model using a visualizer (such as data visualizer 216, shown in FIG. 2 and described below in connection with FIG. 3), or by exporting the data in another fashion (e.g., creating and transmitting a csv file or the like).

Accordingly, the present disclosure sets forth systems, methods, and apparatuses for automated prototyping of a topic model. There are many advantages of these and other embodiments described herein. For instance, through the use of a topic modeling system as described herein, users are provided with a standardized, yet extensible, framework for automatic topic model prototyping that avoids the need for a user to possess significant model development expertise, offers greater consistency, and that can develop usable topic models in far less time than required by traditional approaches. In addition, the solutions described herein offer compatibility with popular computational frameworks such as sklearn and gensim. Finally, the solutions described herein are extensible, and can be leveraged for other machine learning solutions outside of topic modeling, such as classification and regression.

Although a high level explanation of the operations of example embodiments has been provided above, specific details regarding the configuration of some example embodiments are provided below.

System Architecture

Example embodiments described herein may be implemented using any of a variety of computing devices or servers. To this end, FIG. 1 illustrates an example environment within which embodiments of the present disclosure may operate. As illustrated, a topic modeling system 102 may include a system device 104 in communication with a data store 106. Although system device 104 and data store 106 are described in singular form, some embodiments may utilize more than one system device 104 and/or more than one data store 106. Additionally, some embodiments of the topic modeling system 102 may not require a data store 106 at all. Whatever the implementation, the topic modeling system 102, and its constituent system device(s) 104 and/or data store(s) 106 may receive and/or transmit information via communications network 108 (e.g., the Internet) with any number of other devices, such as the one or more data sources 110A, 110B, through 110N and/or client devices 112A, 112B, through 112N.

System device 104 may be implemented as one or more servers, which may or may not be physically proximate to other components of topic modeling system 102. Furthermore, some components of system device 104 may be physically proximate to the other components of topic modeling system 102 while other components are not. System device 104 may receive, process, generate, and transmit data, signals, and electronic information to facilitate the operations of the topic modeling system 102. Particular components of system device 104 are described in greater detail below with reference to apparatus 200 in connection with FIG. 2.

Data store 106 may comprise a distinct component from system device 104, or may comprise an element of system device 104 (e.g., memory 204, as described below in connection with FIG. 2). Data store 106 may be embodied as one or more direct-attached storage (DAS) devices (such as hard drives, solid-state drives, optical disc drives, or the like) or may alternatively comprise one or more Network Attached Storage (NAS) devices independently connected to a communications network (e.g., communications network 108). Data store 106 may host the software executed to operate the topic modeling system 102. Data store 106 may store information relied upon during operation of the topic modeling system 102, such as various topic models that may be used by the topic modeling system 102, data and documents to be analyzed using the topic modeling system 102, or the like. In addition, data store 106 may store control signals, device characteristics, and access credentials enabling interaction between the topic modeling system 102 and one or more of the data sources 110A-110N or client devices 112A-112N.

The one or more data sources 110A-110N may be embodied by any storage devices known in the art. Similarly, client devices 112A-112N may be embodied by any computing devices known in the art, such as desktop or laptop computers, tablet devices, smartphones, or the like. The one or more data sources 110A-110N and the one or more client devices 112A-112N need not themselves be independent devices, but may be peripheral devices communicatively coupled to other computing devices.

Although FIG. 1 illustrates an environment and implementation of the present disclosure in which the topic modeling system 102 interacts with one or more client device 112, in some embodiments users may directly interact with the topic modeling system 102 (e.g., via input/output circuitry of system device 104), in which case a separate client device 112 may not be utilized. Whether by way of direct interaction or via a separate client device 112, a user may communicate with, operate, control, modify, or otherwise interact with the topic modeling system 102 to perform functions described herein and/or achieve benefits as set forth in connection with this disclosure.

Example Implementing Apparatuses

Figure 2:
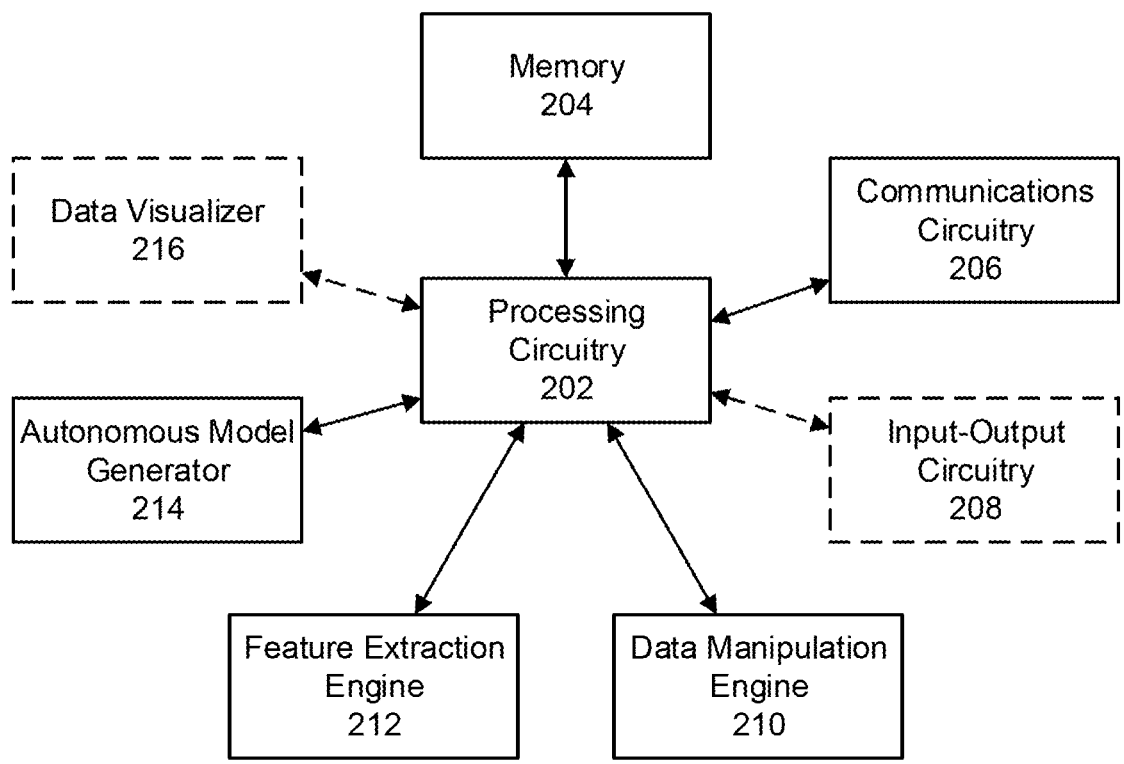
FIG. 2 illustrates a schematic block diagram of example circuitry embodying a device that may perform various operations in accordance with some example embodiments described herein.

System device 104 of the topic modeling system 102 (described previously with reference to FIG. 1) may be embodied by one or more computing devices or servers, shown as apparatus 200 in FIG. 2. As illustrated in FIG. 2, the apparatus 200 may include processor 202, memory 204, communications circuitry 206, input-output circuitry 208, data manipulation engine 210, feature extraction engine 212, autonomous model generator 214, and data visualizer 216, each of which will be described in greater detail below. While the various components are only illustrated in FIG. 2 as being connected with processor 202, it will be understood that the apparatus 200 may further comprises a bus (not expressly shown in FIG. 2) for passing information amongst any combination of the various components of the apparatus 200. The apparatus 200 may be configured to execute various operations described above in connection with FIG. 1 and below in connection with FIGS. 4-11.

The processor 202 (and/or co-processor or any other processor assisting or otherwise associated with the processor) may be in communication with the memory 204 via a bus for passing information amongst components of the apparatus. The processor 202 may be embodied in a number of different ways and may, for example, include one or more processing devices configured to perform independently. Furthermore, the processor may include one or more processors configured in tandem via a bus to enable independent execution of software instructions, pipelining, and/or multithreading. The use of the term "processor" may be understood to include a single core processor, a multi-core processor, multiple processors of the apparatus 200, remote or "cloud" processors, or any combination thereof.

The processor 202 may be configured to execute software instructions stored in the memory 204 or otherwise accessible to the processor (e.g., software instructions stored on a separate data store 106, as illustrated in FIG. 1). In some cases, the processor may be configured to execute hard-coded functionality. As such, whether configured by hardware or software methods, or by a combination of hardware with software, the processor 202 represent an entity (e.g., physically embodied in circuitry) capable of performing operations according to various embodiments of the present invention while configured accordingly. Alternatively, as another example, when the processor 202 is embodied as an executor of software instructions, the software instructions may specifically configure the processor 202 to perform the algorithms and/or operations described herein when the software instructions are executed.

Memory 204 is non-transitory and may include, for example, one or more volatile and/or non-volatile memories. In other words, for example, the memory 204 may be an electronic storage device (e.g., a computer readable storage medium). The memory 204 may be configured to store information, data, content, applications, software instructions, or the like, for enabling the apparatus to carry out various functions in accordance with example embodiments contemplated herein.

The communications circuitry 206 may be any means such as a device or circuitry embodied in either hardware or a combination of hardware and software that is configured to receive and/or transmit data from/to a network and/or any other device, circuitry, or module in communication with the apparatus 200. In this regard, the communications circuitry 206 may include, for example, a network interface for enabling communications with a wired or wireless communication network. For example, the communications circuitry 206 may include one or more network interface cards, antennas, buses, switches, routers, modems, and supporting hardware and/or software, or any other device suitable for enabling communications via a network. Furthermore, the communications circuitry 206 may include the processing circuitry for causing transmission of such signals to a network or for handling receipt of signals received from a network.

The apparatus 200 may include input-output circuitry 208 configured to provide output to a user and, in some embodiments, to receive an indication of user input. It will be noted that some embodiments will not include input-output circuitry 208, in which case user input may be received via a separate device such as a client device 112 (shown in FIG. 1). The input-output circuitry 208 may comprise a user interface, such as a display, and may further comprise the components that govern use of the user interface, such as a web browser, mobile application, dedicated client device, or the like. In some embodiments, the input-output circuitry 208 may include a keyboard, a mouse, a touch screen, touch areas, soft keys, a microphone, a speaker, and/or other input/output mechanisms. The input-output circuitry 208 may utilize the processor 202 to control one or more functions of one or more of these user interface elements through software instructions (e.g., application software and/or system software, such as firmware) stored on a memory (e.g., memory 204) accessible to the processor 202.

In addition, the apparatus 200 further comprises a data manipulation engine 210 that ingests and pre-processes data for use by the topic modeling system 102. The data manipulation engine 210 may utilize processor 202, memory 204, or any other hardware component included in the apparatus 200 to perform these operations, as described in connection with FIGS. 4-11 below. The data manipulation engine 210 may further utilize communications circuitry 206 to gather data from a variety of sources (e.g., data sources 110A-110N or data store 106, as shown in FIG. 1), may utilize input-output circuitry 208 to receive data from a user, and in some embodiments may utilize processor 202 and/or memory 204 to generate source data for ingestion and pre-processing from other data available to the apparatus 200.

In addition, the apparatus 200 further comprises feature extraction engine 212, which includes hardware components designed for generating numeric representations from a series of text inputs. The feature extraction engine 212 may utilize processor 202, memory 204, or any other hardware component included in the apparatus 200 to generate such numeric representations or to perform other feature extraction operations, as described in connection with FIGS. 4-11 below. The feature extraction engine 212 may further utilize communications circuitry 206 to receive a set of text for which a numeric representation is desired, may utilize input-output circuitry 208 to receive such text from a user, or may receive a set of text produced by the data manipulation engine 210 during data ingestion.

The apparatus 200 also comprises autonomous model generator 214, which includes hardware components designed for training a set of topic models, scoring the topic models in the set, and/or selecting a particular topic model from the set of topic models. Autonomous model generator 214 may utilize processor 202, memory 204, or any other hardware component included in the apparatus 200 to perform these operations, as described in connection with FIGS. 4-11 below. Autonomous model generator 214 may further utilize communications circuitry 206 to transmit one or more of the trained topic models to a separate device or data store.

Finally, the apparatus 200 may also comprise a data visualizer 216, which includes hardware components designed for visualizing the output of a particular topic model. The data visualizer 216 may utilize processor 202, memory 204, communications circuitry 206, input-output circuitry 208, or any other hardware component included in the apparatus 200 to gather the output data for visualization, as described in connection with FIG. 3-11 below. The data visualizer 216 may further utilize input-output circuitry 208 to present such data to a user in the manner described in connection with FIGS. 3 and 11.

Although components 202-216 are described in part using functional language, it will be understood that the particular implementations necessarily include the use of particular hardware. It should also be understood that certain of these components 202-216 may include similar or common hardware. For example, the data manipulation engine 210, feature extraction engine 212, autonomous model generator 214, and data visualizer 216 may each at times leverage use of the processor 202, memory 204, communications circuitry 206, or input-output circuitry 208, such that duplicate hardware is not required to facilitate operation of these physical elements of the apparatus 200 (although dedicated hardware elements may be used for any of these components in some embodiments, such as those in which enhanced parallelism may be desired). Use of the terms "circuitry," and "engine" with respect to elements of the apparatus therefore shall be interpreted as necessarily including the particular hardware configured to perform the functions associated with the particular element being described. Of course, while the terms "circuitry" and "engine" should be understood broadly to include hardware, in some embodiments, the terms "circuitry" and "engine" may in addition refer to software instructions that configure the hardware components of the apparatus 200 to perform the various functions described herein.

Although data manipulation engine 210, feature extraction engine 212, autonomous model generator 214, and data visualizer 216 may leverage processor 202, memory 204, communications circuitry 206, or input-output circuitry 208 as described above, it will be understood that any of these elements of apparatus 200 may include one or more dedicated processor, specially configured field programmable gate array (FPGA), or application specific interface circuit (ASIC) to perform all, some, or none of its corresponding functions, and may accordingly leverage processor 202 executing software stored in a memory (e.g., memory 204), memory 204, communications circuitry 206 or input-output circuitry 208 for enabling any functions not performed by special-purpose hardware elements. In all embodiments, however, it will be understood that the data manipulation engine 210, feature extraction engine 212, autonomous model generator 214, and data visualizer 216 are implemented via particular machinery designed for performing the functions described herein in connection with such elements of apparatus 200.

In some embodiments, various components of the apparatus 200 may be hosted remotely (e.g., by one or more cloud servers) and thus need not physically reside on the corresponding apparatus 200. Thus, some or all of the functionality described herein may be provided by third party circuitry. For example, a given apparatus 200 may access one or more third party circuitries via any sort of networked connection that facilitates transmission of data and electronic information between the apparatus 200 and the third party circuitries. In turn, that apparatus 200 may be in remote communication with one or more of the other components describe above as comprising the apparatus 200.

As will be appreciated based on this disclosure, example embodiments contemplated herein may be implemented by an apparatus 200. Furthermore, some example embodiments may take the form of a computer program product comprising software instructions stored on at least one non-transitory computer-readable storage medium (e.g., memory 204). Any suitable non-transitory computer-readable storage medium may be utilized, some examples of which are non-transitory hard disks, CD-ROMs, flash memory, optical storage devices, and magnetic storage devices. It should be appreciated with respect to certain devices embodied by apparatus 200 as described in FIG. 2 that loading the software instructions onto a computing device or apparatus produces a particular, special-purpose machine comprising the means for implementing various functions described herein.

Having described specific components of an example apparatus 200 as shown in FIG. 2, example embodiments of the present disclosure are described below in connection with a series of flowcharts.

Topic Model Visualization

Figure 3:
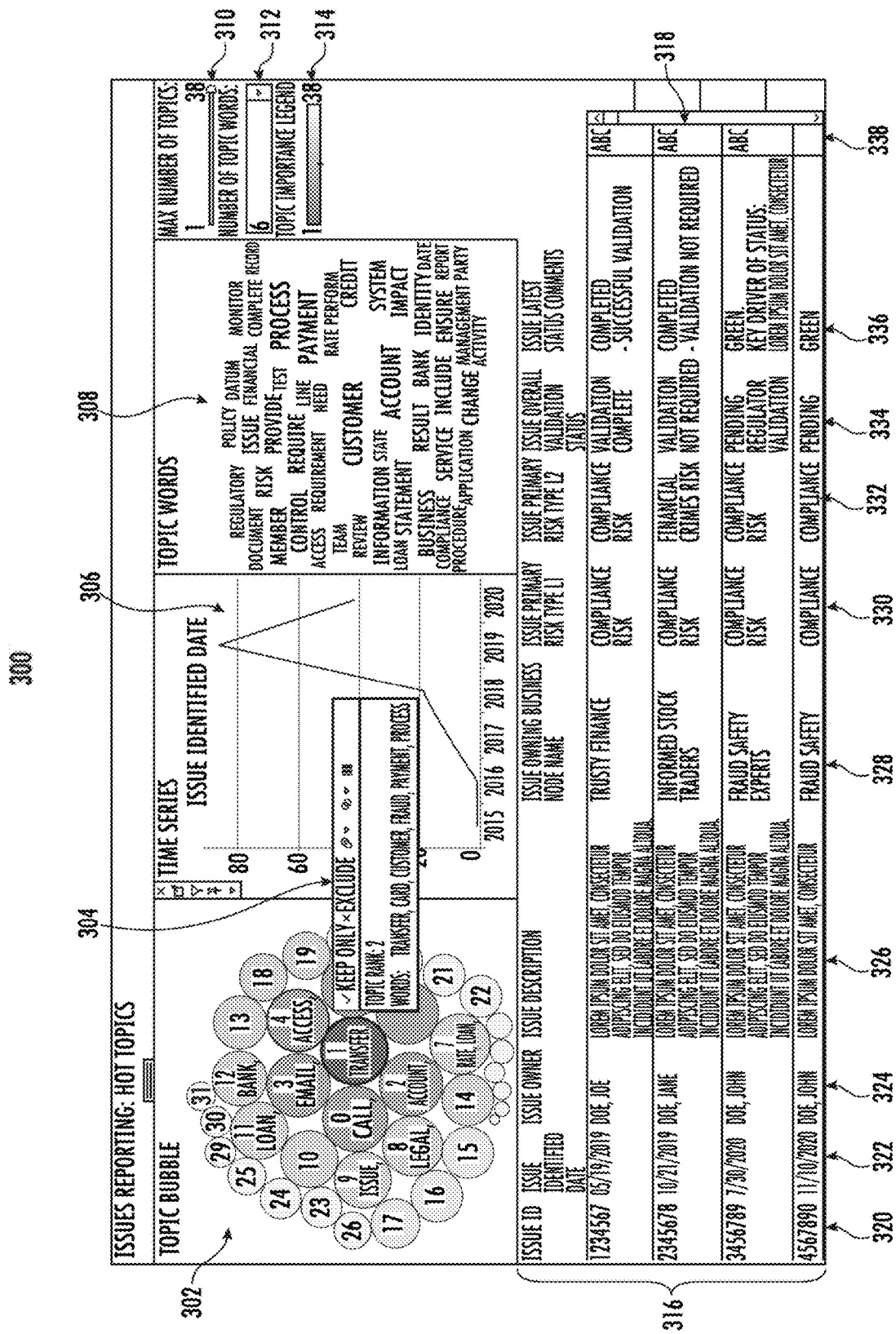
FIG. 3 illustrates an example user interface for visualization of topic model output, as may be used in accordance with some example embodiments described herein.

Turning to FIG. 3, a graphical user interface (GUI) is provided that illustrates how the output from a topic model may be visualized for a user in accordance with example embodiments described herein. As noted previously, a user may interact with the topic modeling system 102 by directly engaging with input-output circuitry 208 of an apparatus 200 comprising a system device 104 of the topic modeling system 102. In such an embodiment, the visualizations shown in FIG. 3 may be presented to a user via a graphical user interface (GUI) displayed by the apparatus 200. Alternatively, a user may interact with the topic modeling system 102 using a separate client device (e.g., client device 112, as shown in FIG. 1), which may communicate with the topic modeling system 102 via communications network 108. In such an embodiment, the visualizations shown in FIG. 3 may be presented to the user via a GUI displayed by the client device 112.

Visualizing the topics for the user is an essential element for analysis using a topic model. Two primary aims can be achieved through visualizing topic model output. First, a user may identify irregularities or errors in the topic model output, thus suggesting that changes to the topic model are in order to enhance the quality of the topic model output. Through use of visualization in this fashion, a user may iteratively prototype a topic model, evaluate the topic model, modify one or more parameters used for training of the topic model, and then re-train the topic model. In other words, visualization of a topic model in the manner set forth herein enables a user to iterate and inspect aspects of the model and tweak parameters as required. Second, however, a user may visualize the output of a topic model as part of a real-world utilization of the topic model to utilize broad-based thematic information from the corpus of documents evaluated by the topic model and thereby enhance traditional operation of a business process to which those documents relate. But even beyond these particular uses, may other uses of the visualization operations described herein are available. For instance, a user may also compare the output of multiple topic model across multiple figures of merit such as topic-word distribution, the topic correlations, or the like, and in doing so may gain additional insight into the set of documents, or may gain further insight into the quality and accuracy of one or another of the topic models themselves.

Regardless of the ultimate purpose for which a topic model may be inspected, the visualization itself may provide a variety of different graphical elements that assist the user in understanding and engaging with the output of a prototyped topic model. Some examples of such graphical elements will now be discussed with reference to FIG. 3, which illustrates an interactive GUI 300 that may be presented to a user.

As shown in FIG. 3, the GUI 300 may display a series of graphical elements (such as graphical elements 302, 306, 308, and 316) to visualize the output produced by a topic model. It will be understood that while four such graphical elements are shown in GUI 300, these are not the only graphical elements that may be shown, nor is each of these elements required to be shown by the GUI 300. Rather, these graphical elements are examples only, and may, for instance, comprise a set of default graphical elements that are illustrated by the GUI 300. It will be understood that a user may customize the visualization to show more or fewer graphical elements, to present any selected graphical elements on different areas of the GUI, to re-size the presented graphical elements as desired, or to perform any other manipulations that may affect which graphical elements to present, where to present them. Moreover, there are graphical element manipulations that may be made using the "max number of topics" slider 310 and the "number of topic words" pull-down menu 312.

Turning first to the particular graphical elements shown in GUI 300, graphical element 302, internally titled as a "topic bubble," depicts a series of circles representing various topics identified by topic model that has been trained on a particular set of documents. The size of each circle within the graphical element 302 reflects the relative number of documents having a sufficiently high probability of assignment to the topic corresponding to that circle. The sizes of the circles thus visually illustrate the prevalence of different topics across the set of documents used to train the topic model. The rank-ordering of the various topics represented in the topic bubble may also be illustrated using shading or coloring of the various circles, in conjunction with a topic importance legend 314 that maps the shading or coloring on a gradient from the most important topics (the left side of the legend) to least important topic (on the right side of the legend). To view additional information about the topic represented by a particular circle, a user may click on the particular circle within graphical element 302 (or, in some embodiments, may hover the mouse cursor over the circle), which causes a pop-up window 304 to appear. In this case, the circle labeled "1 transfer" is selected, causing pop-up window 304 to appear. Pop-up window 304 provides additional information about the "transfer" circle, such as the topic rank illustrating the rank-ordering of the topic amongst the set of topics generated by the topic model. In this case, the topic rank is 2, indicating that the "transfer" topic is the second most prevalent topic for the set of documents (note that the topic bubble shown in graphical element 302 illustrates the number "1" in connection with this topic, which already shows that this is the second most prevalent topic (the "car" topic including the number "0" is in fact the most prevalent topic). The pop-up window 304, however, illustrates the six most common words most frequently associated with the topic in question (note that the topic bubble already illustrates the most frequently associated word, "transfer").

Although the pop-up window 304 shown in GUI 300 lists six words, the number of words shown in a pop-up window of this kind may be modified by a user through manipulation of the pull-down menu 312 (shown in GUI 300 as having the value "6"). Changing the number of words using pull-down menu 312 (to, say, "3", or "10" or any number) will alter the number of words shown in a pop-up window from selection of a particular topic in the topic bubble graphical element 302. Enabling a user to modify the number of words to illustrate in connection with a topic empowers the user to better understand the overarching "theme" of the topic proposed by the trained topic model; the more words that are shown, the better a sense one may receive of the thematic focus of the identified topic. The appropriate number of words to display using a pop-up window will likely vary based on the nature of the documents used to train the topic model and the purpose for which a user is visualizing the data. As such, provision of pull-down menu 312 enables greater customizability by the user of the visualization, thereby expanding the power of the visualization as a tool for iterative prototyping of a topic model.

Turning now to graphical element 306 in FIG. 3, the GUI 300 illustrates time series information regarding the set of documents associated with a particular topic. For instance, when a topic is selected in graphical element 302, that topic may form the basis for the time series data in graphical element 306. By illustrating time series data of this kind, the user can evaluate how recently different topics have evolved in centrality of theme to the set of documents. For instance, graphical element 306 illustrates that the number of documents relevant to the "transfer" topic rose year-over-year from 2016-2019, with a sharp rise in 2019, followed by a significant drop in 2020. From this visualization, a user who is iteratively prototyping a topic model may identify various ways to enhance the fidelity of the topic model (for instance, the user may deduce that a recent spike in relevance of a topic is indicative of inadequate pre-processing of the source documents. A user who is employing the topic model to generate new insights may discover a recently emerging theme in the set of documents that may not have become apparent otherwise.

Graphical element 308 in the GUI 300 illustrates a word cloud representing the commonality of words in the set of documents. The larger the word in the word cloud, the more frequently it occurs in the set of documents. From this visualization, a user who is iteratively prototyping a topic model may identify words that are impacting the topic selections made by the trained topic model, and thus may find ways to enhance the fidelity of the topic model (for instance, the user may deduce that certain words should have been removed or further normalized during pre-processing). Similarly, a user who is employing the topic model to generate new insights may discover that unexpected words are driving thematic classification by the topic model, and this discovery could lead to deeper layers of understanding of the information described in the set of documents.

Finally, graphical element 316 in the GUI 300 illustrates a table of data regarding the set of documents used to train the topic model. In the example shown in FIG. 3, this table illustrates metadata relating to one or more documents in the set of documents from which the example topic model was prototyped. This metadata comprises a series of columns (320, 322, 324, 326, 328, 330, 332, 334, 336, and 338) representing various fields of information regarding the documents, and a series of rows providing relevant information for specific documents in the set of documents. Scrollbar 318 illustrates that all of the documents in the set of documents may be viewable using this visualization. Turning to the specific columns illustrated in graphical element 316, the first column shows an identifier 320 for each document listed in the table. The second column shows the date of origin 322 for the particular document. The third column illustrates the issue owner 324 (the set of documents illustrate issues affecting an organization, and the issue owner is the individual ultimately responsible for resolving the issue). The next column comprises a description 326 of the issue set forth in the document. The following column illustrates the name of the business node entity 328 that owns the issue (in this case, it may be a particular subsidiary or line of business within an organization). In this example, each document describes an issue, and the issue is analyzed to identify types of risks that it may present to the organization. To the right of the business node entity 328 column, the graphical element 316 illustrates a first risk type L1 330 and a second risk type L2 332. Finally, the graphical element 316 illustrates a validation status 334 of an issue, and any user-entered comments 336 regarding the issue.

A user may engage with graphical element 316 in ways that reveal additional insights regarding the document and allow a user to visualize the thematic assessment of individual documents. For instance, in some embodiments the graphical element 316 may be interactive, such that when a user clicks-on or otherwise selects a particular row in the table illustrated by graphical element 316, the other graphical elements of the GUI 300 are updated. For instance, upon selecting a particular row in the table shown by graphical element 316, the topic bubble visualization (graphical element 302) may be updated to highlight the topic having the greatest relevance to the document represented by the row selected in graphical element 316. Furthermore, a pop-up window 304 may appear providing additional insight into the frequent words associated with that particular topic and the overall rank-ordered commonality of that particular topic across the entire set of documents. Similarly, the time series chart (graphical element 306) may be updated to chart the prevalence over time of the topic among the set of documents (e.g., based on the date of origin 322 of the various documents). From this updated visualization data, a user can see not only the known metadata regarding a particular document, but the thematic assessment of that topic by the prototyped topic model, and broader changes regarding that particular type of document across the universe of documents analyzed by the prototyped topic model. Accordingly, having access to these visualization tools, a non-technical user may be able to identify a particular document (in this case, representing a particular issue affecting an organization), and may identify whether this document is thematically unique or is similar to other documents analyzed by the topic model, and may further understand whether the prevalence of similar issues has changed over time.

As another example embodiment, when a user clicks-on or otherwise selects a particular icon in the topic bubble illustrated by graphical element 302, the other graphical elements of the GUI 300 are updated to reveal related data. For instance, upon selecting a particular icon representing a given topic, the table of documents (graphical element 316) may be updated to list metadata regarding only those documents determined by the prototyped topic model to be of relevance to the selected topic. Furthermore, a pop-up window 304 may appear providing additional insight into the frequent words associated with the selected topic and the overall rank-ordered commonality of that topic across the entire set of documents. Similarly, the time series chart (graphical element 306) may be updated to chart the prevalence over time of the selected topic among the set of documents (e.g., based on the date of origin 322 of the various documents). From this updated visualization data, a user can cycle through topics identified by the prototyped topic model, and can understand the prevalence of that thematic category over time, can understand the specific documents most relevant to that thematic category, and can understand the specific words that appear with high frequency in this particular thematic category to better understand the focus of the category itself. Accordingly, having access to these visualization tools, a non-technical user may be able to identify emerging trends across the set of documents used to prototype the topic model, even before those trends would otherwise become intuitively apparent to individuals working with the set of documents.

As can be seen from this example, the graphical element 316 may illustrate specific explanatory data regarding individual documents in the set of documents used to prototype a topic model, and in doing so may enable enhanced strategic planning using topic model visualization, because a user can gather deeper insight about the various documents that may facilitate more strategic decision-making.

Example Operations

Turning to FIGS. 4-11, example flowcharts are illustrated that contain example operations implemented by example embodiments described herein. The operations illustrated in FIGS. 4-11 may, for example, be performed by system device 104 of the topic modeling system 102 shown in FIG. 1. More particularly, these operations may be performed by system device 104 of the topic modeling system 102, which may be embodied by an apparatus 200, which is shown and described in connection with FIG. 2. To perform the operations described below, the apparatus 200 may utilize one or more of processor 202, memory 204, communications circuitry 206, input-output circuitry 208, data manipulation engine 210, feature extraction engine 212, autonomous model generator 214, and data visualizer 216, and/or any combination thereof. It will be understood that user interaction with the topic modeling system 102 may occur directly via input-output circuitry 208, or may instead be facilitated by a separate client device 112, as shown in FIG. 1, and which may have similar or equivalent physical componentry facilitating user interaction.

Figure 4:
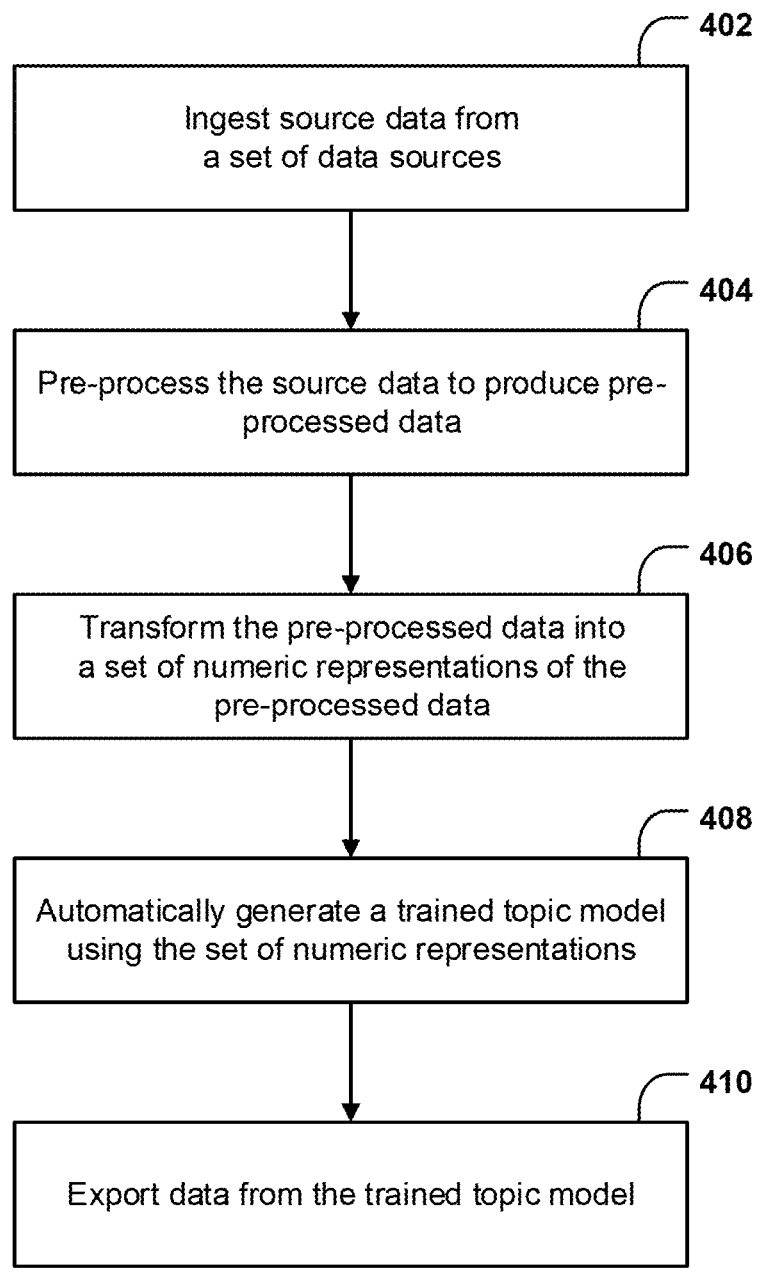
FIG. 4 illustrates an example flowchart for automated prototyping of a topic model, in accordance with some example embodiments described herein.

Turning to FIG. 4, example operations are shown for automated prototyping of a topic model. It will be understood that the operations described in connection with FIG. 4 may comprise components of a model stack, and may be implemented in a variety of ways by an apparatus 200. In the example operations described below, the model stack is encapsulated within a python Jupyter notebook containing pre-defined functions to run each step in the model stack, thereby enabling a user with the option to easily iterate and/or modify any particular step during their research. In one example of such an implementation, the notebook may run on a production blade of a grid computing environment to maximize the availability of computational resources for computational intensive operations. Other example implementations may encapsulate the model stack in other ways, and it may comprise a standalone program executable by the apparatus 200 and may, for instance, be stored on memory 204 of the apparatus 200.

Figure 5:
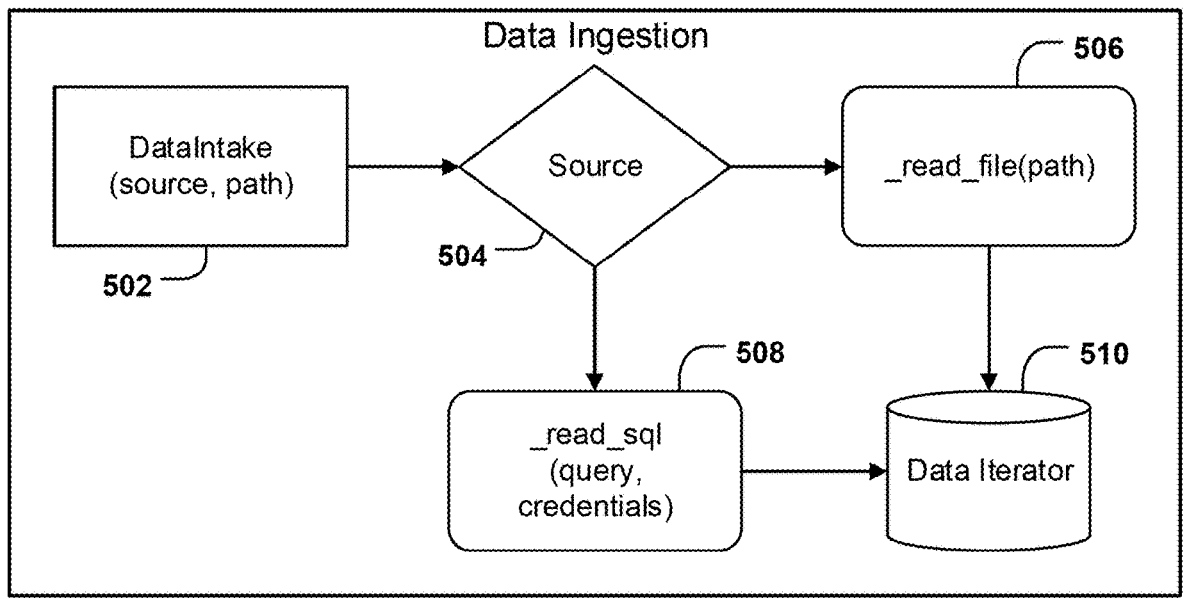
FIG. 5 illustrates some example components that may be involved in data ingestion, in accordance with some example embodiments described herein.

As shown by operation 402, the apparatus 200 includes means, such as data manipulation engine 210 or the like, for ingesting source data from a set of data sources. The set of data sources from which data is to be ingested may be remote from the apparatus 200 (e.g., where the apparatus 200 embodies a system device 104 of a topic modeling system 102 as shown in FIG. 1, the set of data sources may comprise any of data sources 110A-110N), they may be local to the apparatus 200 (e.g., the data sources may be hosted by a data store 106 connected to the system device 104), or they may comprise a combination of remote and local data sources. Some underlying mechanics of this data ingestion operation are illustrated in FIG. 5, which will be referenced periodically below. As shown at element 502 of FIG. 5, a DataIntake(source, path) method may be called to retrieve data from each given data source (element 504). The variables for the DataIntake method may be specified by a user and may identify each particular data source (the "source") and its corresponding path ("path"). The data to be ingested from each data source may be structured either in a file or database format, requiring access via a query with SQL credentials, or the data may be located at a file path and read directly in python. By calling the DataIntake method at element 502 for a particular source (element 504), the data manipulation engine 210 may invoke additional steps illustrated by elements 506 and 508 to produce a data iterator object 510.

At element 506, the data manipulation engine 210 may invoke a read_file(path) method to read data using pandas from a file given the particular file path. This operation may, by default, specify the value N of a "chunksize=N" attribute to enable ingestion of a large dataset in a batch process. At element 508, the data manipulation engine 210 may invoke a read.sql(query, credentials) method in which the SQL query may be provided along with user credentials, and which may in turn utilize hidden SAS PROC SQL or Open Database Connectivity (odbc) methods to enable more complicated SQL queries. Either way, ingesting the source data by data manipulation engine 210 may comprise hydrating or populating an iterator object (e.g., data iterator object 510, as shown in FIG. 5) with the ingested data, which may then be utilized by the data manipulation engine 210 for pre-processing as described below in connection with operation 404. For instance, subsequent calls to the data iterator object may then produce a batch of ingested data in a manner consumable by the remainder of the functions of the model generation pipeline. The iterator object may, for instance, generate minibatch DataFrames enabling minibatch training of topic models, which requires fewer processing resources for model prototyping than other types of topic model training. If multiple columns of information are selected for a given dataset, the data manipulation engine 210 may be concatenated into one field before being funneled into the rest of the pipeline.

Ingesting the source data as shown by operation 402 may include identifying, by data manipulation engine 210 or the like, a set of data conditions relating to the set of data sources. For instance, a user may provide to the apparatus 200 (e.g., from a client device 112, through communications network 108, and to communications circuitry 206 of the apparatus 200 comprising the system device 104 of the topic modeling system 102 shown in FIG. 1, via direct user interaction with input-output circuitry 208, via predefined settings stored by a data store 106 and/or memory 204, or the like) information regarding the nature of the data to be ingested. For instance, a user may specify particular columns of interest from particular data sources. If a user would like to ultimately visualize time series data with respect to some categorical variable like "Line of Business," relevant data fields can be specified by the user at the beginning of the data ingestion process to enable ingestion of the relevant data fields which, in turn, facilitate the downstream visualization of such data. As another example, the user may specify date ranges of interest, along with any other conditional statements regarding the data to be ingested. Each conditional statement may, for instance, specify a feature of a data element that must be either true or false. Ingesting the source data may thus include collecting, by data manipulation engine 210 or the like, the data from the set of data sources that satisfies the set of data conditions relating to the set of data sources, such that the source data ingested by the apparatus 200 comprises this collected data. Where a set of data conditions such as date ranges or conditional statements are specified by the user, the source data satisfying set of data conditions will be collected by the data manipulation engine 210 while other data may not be collected by the data manipulation engine 210.

Ingesting the source data as shown by operation 402 may further include filtering or screening of the source data by data manipulation engine 210 or the like. For instance, the data manipulation engine 210 may perform preliminary data validation operations to ensure that the data ingested meets minimum criteria for modeling. To this end, the data manipulation engine 210 may perform operations to ensure that a target text column in a data set has enough observations and comprises a string type (necessary for a topic model to produce meaningful results). Failure by a dataset, or a component thereof, to meet pre-established validation criteria may cause the data manipulation engine 210 not to ingest the dataset or component thereof. Furthermore, the data manipulation engine 210 may perform a data screening operation to automatically reject datasets that do not meet a minimum standard for modeling, and this operation may include requiring a certain file type (comma-separated values (csv), Statistical Analysis Software (SAS), text (txt), or the like), rejecting files with mostly missing rows, filtering dates, requiring a minimum data size for modeling, and ensuring proper conversion of csv files that may have issues with text data. For instance, the data manipulation engine 210 may only read a csv file or a pandas::DataFrame object, and may reject other formats of data. However, in some embodiments these data formats may be derivable from any number of sources (such as a query from SAS), thereby permitting the data manipulation engine 210 to ingest data in a broader set of formats provided appropriate initial formatting is performed. In some embodiments, data filtering operations of these kinds may be invoked (or not) at user discretion, with default settings that may be defined by a system administrator. In some embodiments, a user may manipulate which data filtering operations are to be performed, and may define particular requirements for the particular data filtering operations. As such, while the apparatus 200 may utilize default standardized data ingestion operations, the operations are highly customizable by the user.

Returning to FIG. 4, operation 404 illustrates that the apparatus 200 includes means, such as data manipulation engine 210 or the like, for pre-processing the source data to produce pre-processed data. To pre-process the source data, the data manipulation engine 210 may perform a set of data transformations that cleanse the narrative fields provided the data ingestion operations described above in connection with operation 402. For instance, where an iterator object 510 is produced during data ingestion operations, the data manipulation engine 210 may call the iterator object 510 to retrieve source data ingested in operation 402 above and then pre-process the source data retrieved using the iterator object 510.

Figure 6:
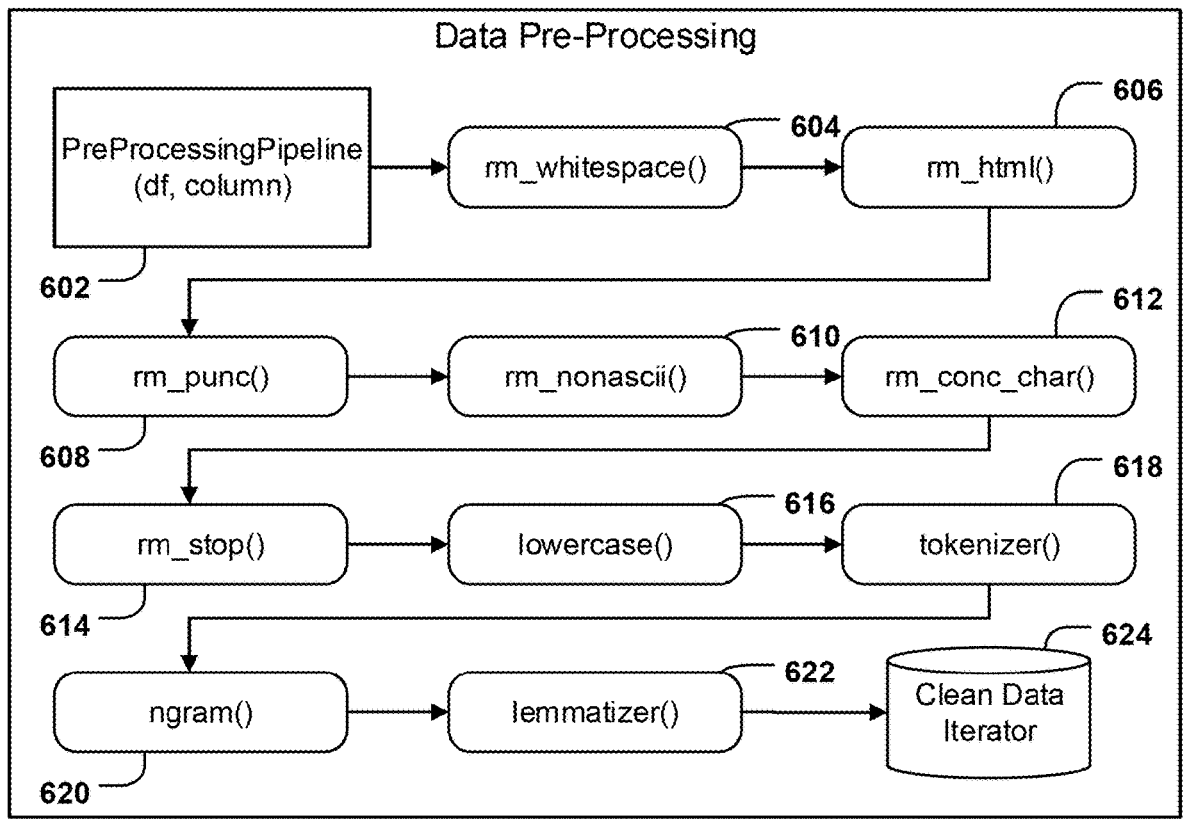
FIG. 6 illustrates some example components that may be involved in pre-processing of data, in accordance with some example embodiments described herein.

An illustration of some of the pre-processing data transformations that may occur at operation 404 is provided in FIG. 6, which will be referenced periodically below. These data transformations may be invoked by the data manipulation engine 210 calling a PreprocessingPipeline (df, column) method, as shown in element 602. The input variables for the PreprocessingPipeline method may be retrieved by the data manipulation engine 210 from the iterator object 510 produced by the data ingestion operation, which may identify a given DataFrame ("df") and the data manipulation engine 210 may specify the corresponding column ("column") where ingested narrative text can be found. The data manipulation engine 210 may then initiate set of data transformations on the DataFrame, as illustrated by elements 604-622, and may then store the resulting cleansed data. As such, pre-processing the source data by data manipulation engine 210 may comprise hydrating or populating an iterator object (e.g., clean data iterator 624, as shown in FIG. 6) with the pre-processed data, which may then be utilized by the feature extraction engine 212 for feature extraction as described below in connection with operation 406. The pre-processed data, in this case, can then be retrieved by calling the clean data iterator object 624 created by the data manipulation engine 210. The clean data iterator object 624 may thus produce a vocabulary that will be passed down the pipeline to conduct feature extraction, as described below in connection with operation 406. It will be understood, however, that in some embodiments the output of the pre-processing operation need not be a callable iterator object, but may comprise a table of the cleansed data that can be utilized during feature extraction.

Examples of the data transformations that may be utilized to pre-process the ingested data include an operation rm_whitespace( ) that removes white space from narrative text (element 602), an operation rm_html( ) that removes HTML tags from narrative text (element 604), an operation rm_punc( ) that removes punctuation from narrative text (element 606), an operation rm_nonascii( ) that removes non-ASCII text from narrative text (element 610)), an operation rm_conc_char( ) that removes consecutive characters occurring more than a predetermined number of times (e.g., three) in a row in narrative text (element 612), an operation rm_stop( ) that removes "stop words" (i.e., words that do not hold much semantic value) from narrative text (element 614), and an operation lowercase( ) that converts narrative text into all lowercase form (element 616). This set of initial feature extraction operations may include, for instance, an ngram( ) operation to convert a series of text into a series of tokens for vectorization (element 704). The data transformations may further include a tokenizer( ) operation to convert a series of text into a series of unigrams for vectorization (element 618). The data transformations may also include an ngram( ) operation (element 620) that can take the list of tokens created by a tokenizer( ) method and combine them into ngrams having a length specified by input parameters (for instance, the parameters (1,2) will return unigrams and bigrams, while the parameters (2,2) will return just bigrams, and the parameters (1,3) will return unigrams, bigrams and trigrams. The data transformations may further include a lemmatizer( ) operation (element 622) to convert a multiple tokens into single tokens where appropriate (e.g., by grouping inflected forms of a word so they can be analyzed as a single item). Refinement data transformations such as stop-word removal, tokenization, and lemmatization are designed normalize the data such that the eventual features that are extracted are smaller and a more significant source of signal.

It will be understood that not every pre-processing operation shown in FIG. 6 need be performed in a given embodiment, and, even when performed, such operations do not need to be performed in the order shown in FIG. 6, but can be performed in any order. Furthermore, other predefined pre-processing operations may be invoked, such as operations to correct misspellings, remove non-alphanumeric text, redact protected class data (e.g., removing words like "his" or "her" to avoid gender bias), remove URLs from narrative text, or the like. Moreover, custom pre-processing operations may be defined via regex, such that a user may encode (e.g., via input provided from a client device 112 as shown in FIG. 1 and to communications circuitry 206, via user interaction with input-output circuitry 208, via predefined settings stored by a data store 106 and/or memory 204, or the like) domain specific pre-processing operations to be performed by the data manipulation engine 210. An example of such a pre-processing operation may be an operation that removes an automatic disclosure notice made in correspondence ingested by the data manipulation engine 210 to avoid the automatic disclosure notice from skewing the training of a topic model.

It will be understood that the FIG. 6 illustrates one set of pre-processing operations (shown by elements 604-616) that may be performed during pre-processing operation 404, and that although a default set of pre-processing operations such as this may be defined by a "TopicPreProcess" object, a different set of pre-processing operations may be utilized in place of the default operations at the discretion of a user. For instance, when implemented via a Jupyter notebook, the user may invoke a default set of pre-processing operations by calling a default preprocessing pipeline in the following manner:

```
In [6]: default = DefaultPreprocessingPipeline( ) #instantiate the default processing pipeline
```

Alternatively, when a user wishes to select alternative data pre-processing operations to be performed by the data manipulation engine 210, the user may specify the specific pre-processing operations in the following manner:

```
In [15]:   new_custom = PreprocessingPipeline([
                         ("nonascii", clean.NonAsciiRemover ( )),
                         ("whitespace", clean.WhiteSpaceRemover( )),
                         ("punctuation", clean.PunctuationRemover ( ))
           ])
           new_custom.pipeline
```

In this latter approach, the user-specified pre-processing operation includes a non-ASCII character removal operation 610, a white space removal operation 604, and a punctuation removal operation 608, but may not include other pre-processing operations. As such, while the apparatus 200 includes default standardized data pre-processing operations that may be performed, the operations are highly customizable by the user. As such, the model stack described herein provides significant flexibility and extensibility not offered by existing modeling solutions.

To provide a user with a sense of the changes in the dictionary before and after the pre-processing, the data manipulation engine 210 may initiate presentation of a word frequency count that illustrates the top N most frequency words before and after pre-processing operations, as well as a few example changes in narratives (selected by randomly as well by largest change in size). This before/after information may be presented to a user via a client device 112, as received from the apparatus 200 through communications circuitry 206 in communication with the client device 112 as shown in FIG. 1. Alternatively, this information may be presented to a user who interacts directly with input-output circuitry 208 of the apparatus 200. This information may be presented via a data visualization such as that shown in FIG. 3, or it may be presented within a python Jupyter notebook, or it may be presented in any other manner such that a user iteratively prototyping a topic model can understand the effects of different pre-processing operations on the data that will be used to train the topic model. Furthermore, the data manipulation engine 210 may store records of the changes made to the documents as class attributes that can be easily accessed via class methods to create a diagnostic report if any issues occur in the preprocessing stage.

Returning to FIG. 4, operation 406 illustrates that the apparatus 200 includes means, such as feature extraction engine 212, or the like, for transforming the pre-processed data into a set of numeric representations of the pre-processed data. The feature extraction engine 212 may either call a clean data iterator object 624 to retrieve the pre-processed data for feature extraction, or may simply receive a table of the pre-processed data as input. The feature extraction engine 212 may transform the pre-processed data into a set of numeric representations using a vectorization operation, as will be described below. However, prior to vectorization of the pre-processed data, the feature extraction engine 212 may first perform a first set of feature extraction operations on the pre-processed data to generate tokens that will in turn be vectorized in a second feature extraction operation in which the set of tokens are used to generate a corresponding set of numeric representations.

Figure 7:
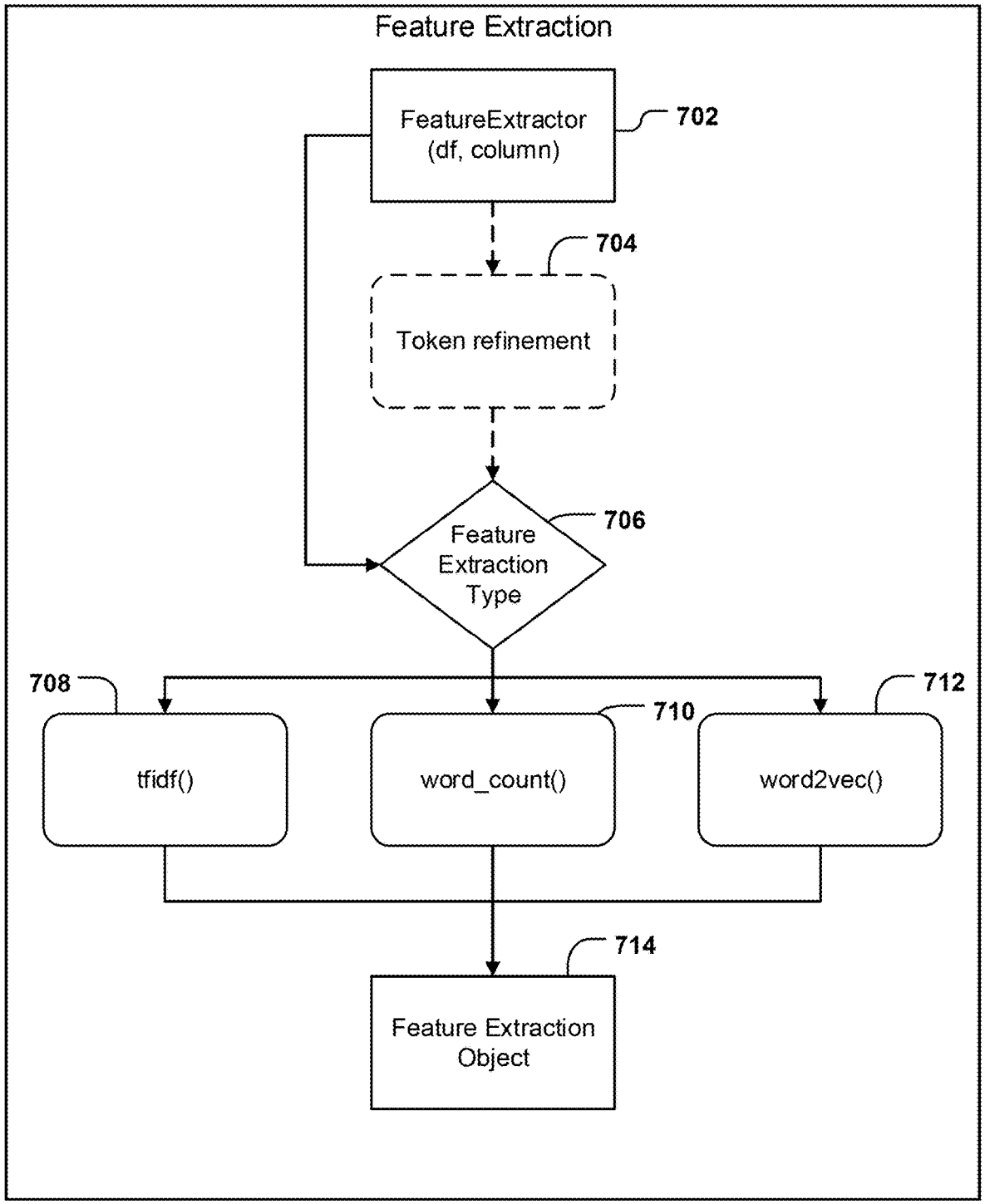
FIG. 7 illustrates some example components that may be involved in feature extraction, in accordance with some example embodiments described herein.

An illustration of an example set of feature extraction operations contemplated herein is provided in FIG. 7. These example feature extraction operations may be invoked by the feature extraction engine 212 calling a FeatureExtractor (df, column) method, as shown in element 702. The input variables for the FeatureExtractor method may be retrieved by the feature extraction engine 212 from the clean data iterator object 624 produced in pre-processing operation 404 above. To this end, the clean data iterator object 624 may produce a DataFrame ("df") and the feature extraction engine 212 may specify a corresponding column ("column") of the DataFrame where narrative text can be found. As noted above, the feature extraction engine 212 may in some embodiments perform a set of initial feature extraction operations on the pre-processed data, or may proceed directly to vectorization operations (shown in FIG. 7 as optional elements 704, 706, and 708). These initial feature extraction operations may comprise token refinement (shown at element 704), which may include natural language processing pre-processing steps such as tokenization and lemmatization. It will be understood that token refinement is an optional step of the feature extraction procedure because such operations are typically performed during pre-processing as described previously. As such, token refinement operations are shown in FIG. 7 with dotted lines, reflecting that the operation is option and need not be performed in every embodiment. When performed, however, token refinement may modify the vocabulary derived from the data ingestion and pre-processing operations recited above. When token refinement is not performed as an initial feature extraction operation, FIG. 7 illustrates an alternative procedure flow indicated by the arrow from element 702 to element 706.

Following performance of any initial feature extraction operations or in lieu of such operations, the next step in the pipeline will be to transform the derived vocabulary into a numeric representation. To do this, the feature extraction engine 212 may then select a type of feature extraction to be performed, as shown at element 706. There are several potential text vectorizations possible, the most common among them being a Term Frequency/Inverse Document Frequency (TF-IDF) operation (e.g., by way of the method tfidf( ) shown in element 708), a term frequency/word counts or "Bag of Words" operation (e.g., by way of the method word_count( ) shown in element 710), a word embedding operation (not shown in FIG. 7), or a word2vec( ) operation (as shown in element 712). Although a particular one of these vectorization operations will be selected by default, a user may specify an alternative vectorization operation (e.g., via input provided from a client device 112, via user interaction with input-output circuitry 208, via predefined settings stored by a data store 106 and/or memory 204, or the like). The FeatureExtractor method may then hydrate or populate a feature extraction object 714 with the pre-processed data, and the feature extraction object 714 may then be utilized by the autonomous model generator 214 to transform any document it is passed into the desired modeling features (e.g., a set of numeric representations corresponding to the text of the document), thereby facilitating topic model generation as described in connection with operation 408.

Returning to the flowchart shown in FIG. 4, operation 408 illustrates that the apparatus 200 includes means, such as autonomous model generator 214 or the like, for generating a trained topic model using the set of numeric representations. While in some embodiments, this operation may comprise the autonomous model generator 214 training a particular topic model, in other embodiments the autonomous model generator 214 may train multiple topic models (which may be of different types and/or utilize different hyperparameters), and then select one of the trained topic models from the set. This latter approach is useful in many implementations because different arrangements of hyper-parameters will produce topic model distributions that are more or less meaningful for a given set of documents. Selection of different hyperparameters may cause changes to pre-processing or feature extraction operations performed to generate the set of numeric representations, as described below in connection with a Tuner( ) method. Similarly, different modeling approaches may be selected that may be more or less effective in particular implementations, such as Latent Dirichlet Allocatation (LDA), hierarchical LDA (hLDA), non-negative matrix factorization (NNMF), or some combination thereof. The modeling approaches used to train a topic model and the hyperparameters chosen for the training of such topic models may be selected in a default manner by the autonomous model generator 214 for ease of use, although it will be understood that these variables may also be predefined by a user (e.g., via input provided through communications circuitry 206 in communication and from a client device 112 as shown in FIG. 1, via user interaction with input-output circuitry 208, via predefined settings stored by a data store 106 and/or memory 204, or the like), and in this manner the autonomous model generator 214 offers both ease of use and compactness (when allowing for default operation) while also enabling extensibility for more sophisticated implementations.

To select a particular trained topic model from the set of trained topic models, the autonomous model generator 214 may utilize a model scoring metric. For instance, the autonomous model generator 214 may contain a model evaluation component to identify a metric to use for evaluation of the set of trained topic models. This metric may comprise one of perplexity, log-likelihood, intra-topic similarity, or coherence. Perplexity, in this case, is a statistical measure of goodness of fit based on held-out data, or in other words, how accurately the various topics created by a trained topic model represent the topics of a new set of documents. Log-likelihood, as used here, refers to a measure of how plausible a model's topics are given the set of documents used to generate them. Intra-topic similarity, as used here, refers to the similarity of the documents relevant to a given topic. And finally, coherence, as used here, refers to topic coherence, and is a measure of the semantic similarity between the frequently occurring words in a topic.

An administrator may predefine a default metric to be used for scoring the trained topic models. Separately, a user may specify one or a plurality of such metrics to use for selection of a trained topic model in a particular implementation (e.g., via input provided through communications circuitry 206 in communication and from a client device 112 as shown in FIG. 1, via user interaction with input-output circuitry 208, via predefined settings stored by a data store 106 and/or memory 204, or the like). Using the identified metric, the model evaluation component of the autonomous model generator 214 may thereafter calculate a metric score for each trained topic model in the set of trained topic models, and then may select the trained topic model from the set of topic models based on the calculated metric scores for each of the set of trained topic models. It will be understood that while a single metric score may be utilized for this purpose, in some embodiments multiple metric scores may be evaluated at the discretion of an administrator designing the default mode of operation or a user customizing a particular implementation of the topic modeling system. Some literature suggests that there may be a decoupling between topic stability and quality, although enabling the use of a metric evaluation process of this nature may nevertheless be a useful benchmark. The metric(s) to be used will be stored as attributes within a topic modeling pipeline class for ease of access and also as a diagnostic tool (e.g., enabling a user to utilize the metric to modify and/or improve the topic model prototyping process by repeatedly prototyping a topic model, viewing the metric score, modifying aspects of the topic model prototyping process, and then repeating).

Figure 8:
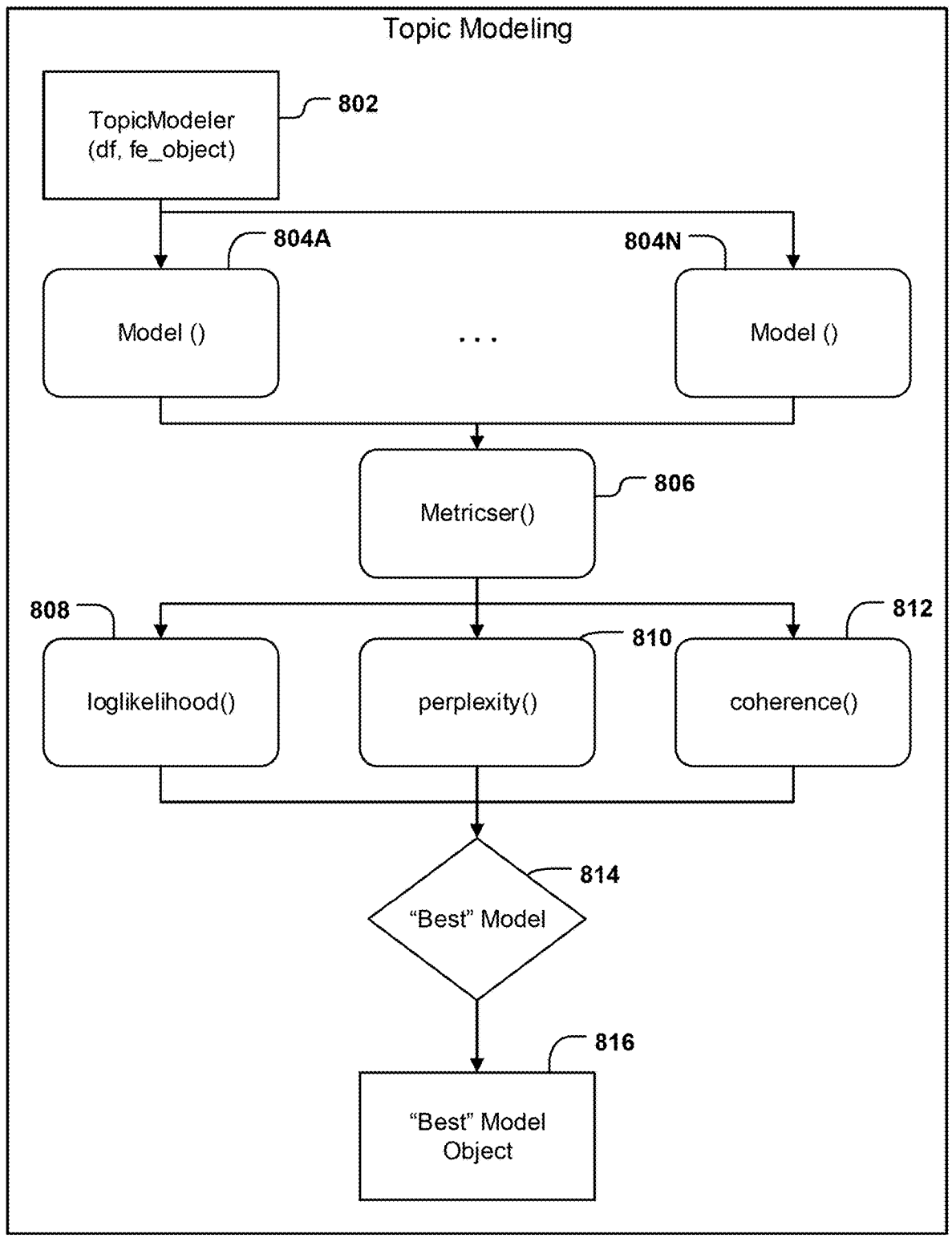
FIG. 8 illustrates some example components that may be involved in topic modeling, in accordance with some example embodiments described herein.

An illustration of an example set of topic modeling operations contemplated herein is provided in FIG. 8. These example topic modeling operations may be invoked by the autonomous model generator 214 calling a TopicModeler (df, fe_object) method, as shown in element 802. The input variables for the TopicModeler method may be retrieved by the autonomous model generator 214 from the feature extraction object 714 produced in the feature extraction operation 406 above. To this end, the clean data iterator object 624 may produce a DataFrame ("df") and the autonomous model generator 214 may call the feature extraction object 714 ("fe_object") to retrieve feature extraction data corresponding to the DataFrame. The autonomous model generator 214 may then train a set of candidate topic models (elements 804A through 804N) using this input data. As noted previously, the autonomous model generator 214 may invoke a Tuner( ) method (not shown in FIG. 8) to provide hyper-parameter tuning functionality. The Tuner( ) method may automatically cycle through a list of various hyperparameter grids over a given DataFrame ("df") and pre-processing object ("pp_object") to select an ideal series of hyperparameters. In doing so, the Tuner( ) method may direct pre-processing and feature extraction operations, such as by controlling the size of the vocabulary of words used in feature extraction, selecting whether to utilize TF-IDF, TF, or another vectorization approach for generating numeric representations, or the like. The autonomous model generator 214 may then utilize the set of hyperparameters for topic model training. As it relates to the model training process, it will be understood, the clean data iterator object 624 and the feature extraction object 714 are iterator objects, and as such may each produce, in a given iteration, a single minibatch representing a portion of the overall data producible by the iterator object, and an administrator may set a default size for each minibatch. By repeatedly calling these iterator objects, the autonomous model generator 214 may iterate through the entire corpus of data producible by each of the iterator objects. In this fashion, the pre-processing and feature extraction operations facilitate minibatch training of topic models. The use of minibatch training of topic models allows autonomous model generator 214 to train topic models of any size dataset in manageable increments.

As shown at element 806, the autonomous model generator 214 may invoke a Metricser( ) method that can comprise any of the various metrics scoring methods described above (e.g., a loglikelihood( ) method shown as element 808, a perplexity( ) method as shown at element 810, or a coherence( ) method as shown at element 812). It will be understood that some, all, or none of these metric scoring methods may be performed in any given embodiment. Furthermore, other metric scoring methods may be performed at this stage as well, as may be defined by a user (e.g., via input provided from client device 112 or input-output circuitry 208, via predefined settings stored by a data store 106 and/or memory 204, or the like). Following scoring of the set of trained topic models, the autonomous model generator 214 may select a "best" model, as shown at element 814, and may then produce a best model object 816, the output of which may be then be visualized as described above in connection with FIG. 3 and below in connection with operation 410.

Returning back to FIG. 4, operation 410 illustrates that the apparatus 200 may include means, such as communications circuitry 206, input-output circuitry 208, autonomous model generator 214, data visualizer 216, or the like, for generating a set of output data using the trained topic model, and then exporting the generated data. For instance, the data visualizer 216 may generate a set of output data using the trained topic model, and any of the communications circuitry 206, input-output circuitry 208, autonomous model generator 214, or data visualizer 216 may export that set of output data for subsequent review and/or visualization by a user directly engaged with the apparatus 200 or who is utilizing a client device 112 that is remote from the apparatus 200. In some embodiments, the output produced by the trained topic model may be stored by a memory (e.g., memory 204, and/or in a data store 106). As noted previously, the user may invoke data visualizer 216 to explore the characterizations of the target documents produced by the trained topic model and either utilize them to revise and retrain a topic model or to operationalize the information in a variety of implementations.

Figure 9:
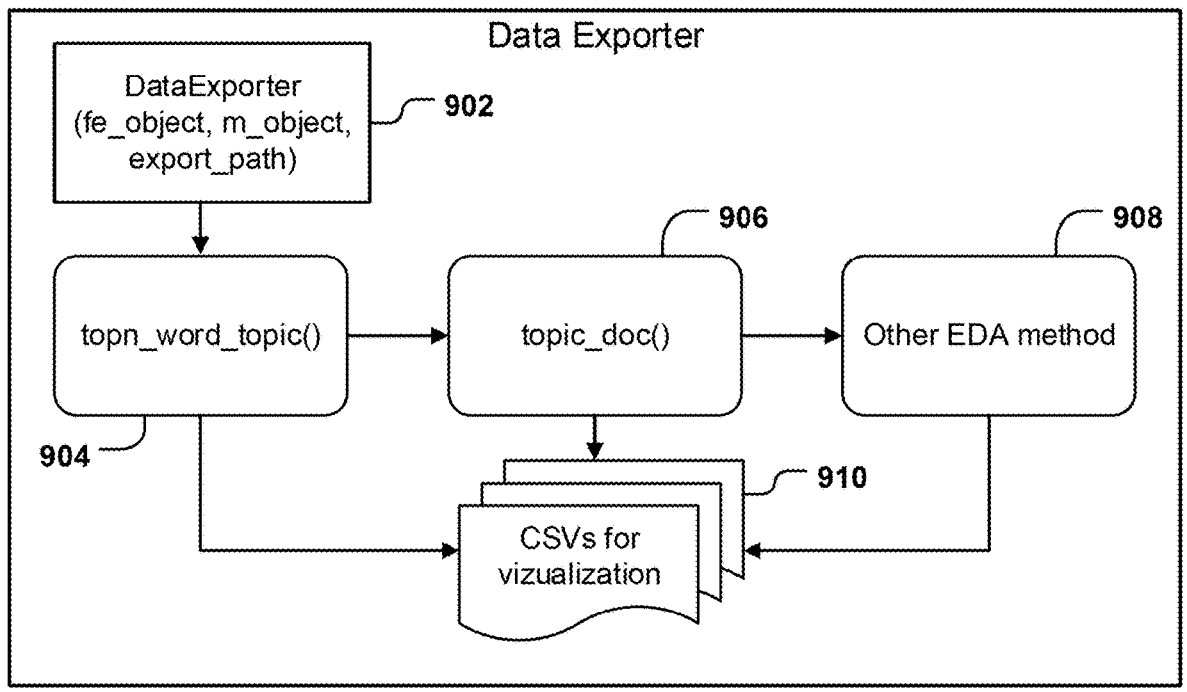
FIG. 9 illustrates some example components that may be involved in exporting data from a prototyped (e.g., trained) topic model, in accordance with some example embodiments described herein.

An example set of operations for exporting data from a topic model is described in connection with FIG. 9. These example operations may be invoked by the autonomous model generator 214 calling a DataExporter (fe_object, m_object, export_path) method, as shown in element 902. To this end, the autonomous model generator 214 may call the feature extraction object 714 ("fe_object") to retrieve feature extraction data, may call a best model object 816 to retrieve the trained topic model generated by the autonomous model generator 214, and may identify an export_path to which exported data shall be stored. The autonomous model generator 214 may then retrieve a set of numeric representations and evaluate those numeric representations by calling one or more exploratory data analysis (EDA) methods. As shown in FIG. 9, the autonomous model generator 214 calls a topn_words_topic( ) method (element 904) that may produce the words occurring with the highest frequency in the set of modeled data, a topic_doc( ) method (element 906) identifying a series of topics relating to each document in the set of documents, or one or more other EDA methods (shown by element 908). Following performance of the various EDA methods, the autonomous model generator 214 may utilize a write( ) method available within the TopicModeler( ) class to export the returned data for subsequent visualization (e.g., by creating and transmitting a csv file or the like).

Figure 10:
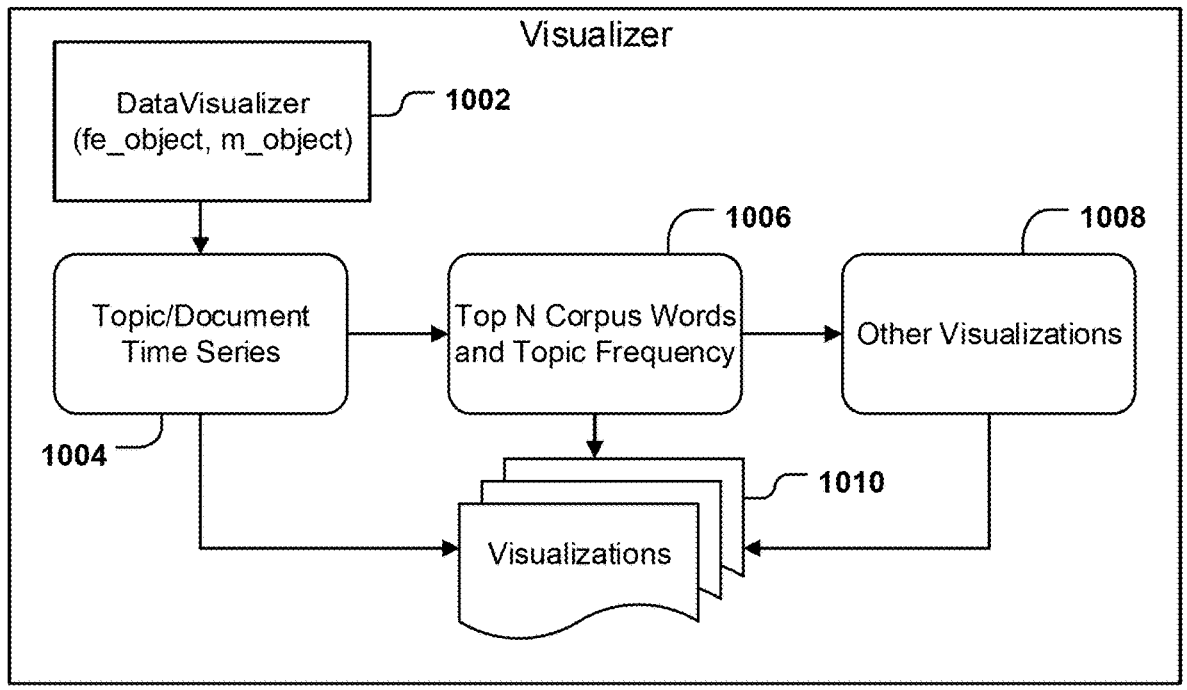
FIG. 10 illustrates some example components that may be involved in visualizing data produced by a prototyped topic model, in accordance with some example embodiments described herein.

An example set of operations for visualizing data from a topic model is described in connection with FIG. 10. Where the operations described above in connection with FIG. 9 illustrate a method for exporting data to enable a separate visualization operation, the example operations described in connection with FIG. 10 enable the apparatus 200 to generate visualizations directly from the data objects created in the prior operations 402-408 (although in some embodiments these example operations could also be performed after initial intake of data that has been exported from a topic model object in the manner described above in connection with FIG. 9). These example operations may be invoked by data visualizer 216 calling a Data Visualizer (fe_object, m_object) method, as shown in element 1002. The data visualizer 216 may call the feature extraction object 714 ("fe_object") to retrieve feature extraction data, may call a best model object 816 ("m_object") to retrieve the trained topic model generated by the autonomous model generator 214, and may identify an export_path to which exported data shall be stored. The data visualizer 216 may then retrieve a set of numeric representations and evaluate those numeric representations by calling one or more exploratory data analysis (EDA) methods. As shown in FIG. 10, the data visualizer 216 may then directly create visualizations using native python methods, and may create a topic/document time series visualization (element 1004) that may, for instance, comprise a graphical element 306 as described previously in connection with FIG. 3. Similarly, the data visualizer 216 may directly create a top words visualization (element 1006) that may, for instance, comprise a graphical element 308 as described previously in connection with FIG. 3, or a topic frequency visualization (also shown in element 1006) that may, for instance, comprise a graphical element 302 as described previously in connection with FIG. 3. Of course, the data visualizer 216 may create other visualizations, as shown by operation 1008. Following creation of one or more visualizations, the data visualizer 216 may directly present the visualizations to a user, as described previously in connection with FIG. 3 above, and in connection with FIG. 11 below.

As described above, example embodiments provide methods and apparatuses that enable automated prototyping of a topic model. Example embodiments thus provide tools that overcome the problems faced by traditional approaches used to create topic models. For instance, through the use of a topic modeling system as described herein, users are provided with a standardized, yet extensible, framework for automatic topic model prototyping that avoids the need for a user to possess significant model development expertise, offers greater consistency, and that can develop usable topic models in far less time than required by traditional approaches. In addition, the solutions described herein offer compatibility with popular computational frameworks such as sklearn and gensim. Moreover, the solutions described herein are extensible, and can be leveraged for other machine learning solutions outside of topic modeling, such as classification and regression. Finally, by automating functionality that has historically required significant human effort and manual labor, the speed and consistency of the topic model prototyping functions described above unlocks many potential new functions that have historically not been available, such as the ability to apply topic models to evaluate large sets of data in situations where time is of the essence.

Figure 11:
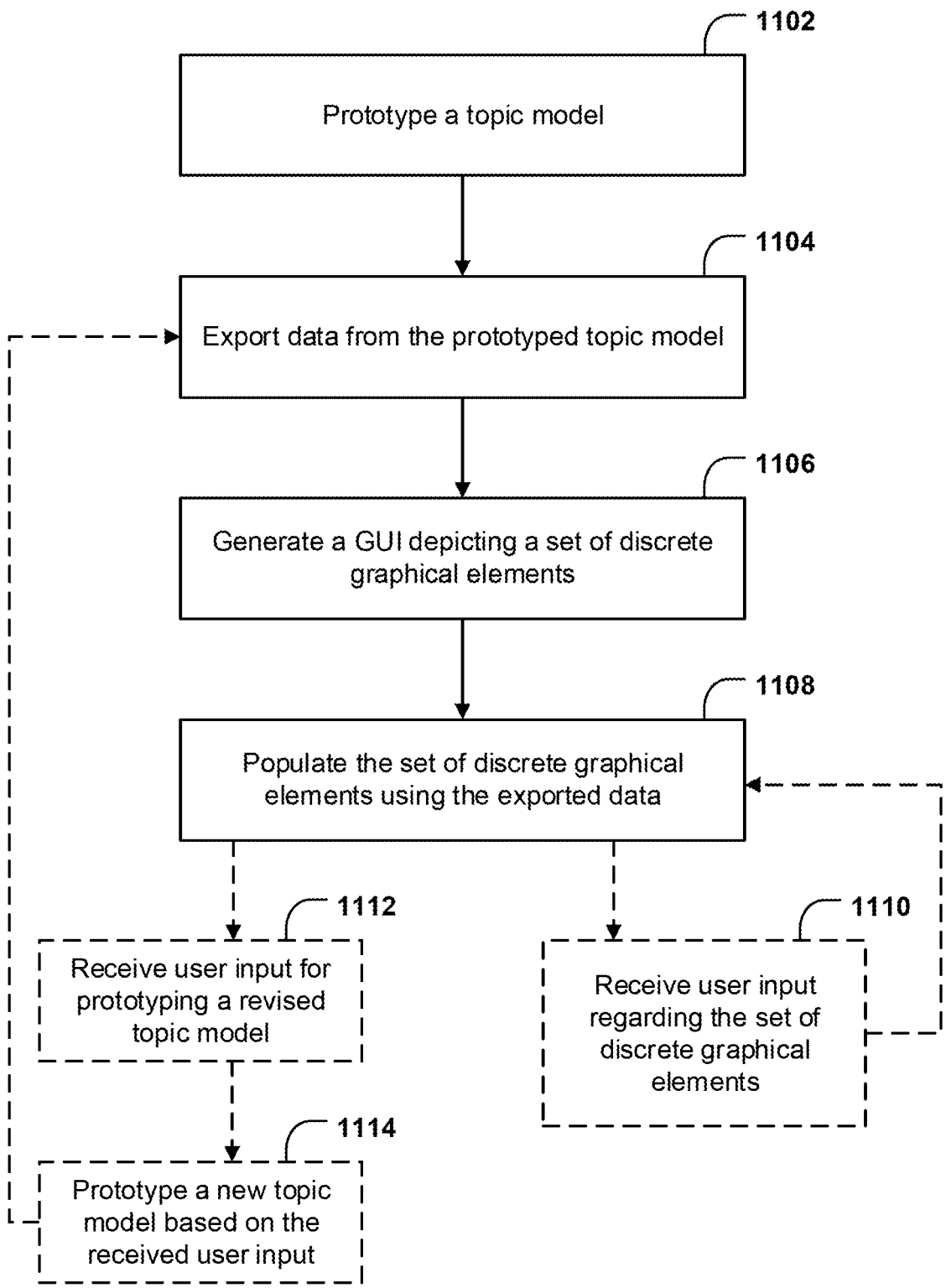
FIG. 11 illustrates an example flowchart describing operations used in connection with visualization of topic model output, in accordance with some example embodiments described herein.

Turning next to FIG. 11, example operations are shown for utilizing topic model visualization, which enhance user engagement with a prototyped topic model. A user may, for instance, utilize visualizations of the output of a prototyped topic model to determine ways to develop a better topic model (e.g., through selection of new refinements in data ingestion, pre-processing, feature extraction, topic modeling, or the like). Alternatively, a user may simply utilize the visualizations to more easily access the insight provided by a topic model so the user can leverage that insight to enhance business operations; in this regard, a topic model can be used to generate actionable data-driven insights that can systematically enhance the quality of user decision-making. The example operations described below are provided by a topic modeling system 102 via a system device 104 comprising an apparatus 200. This device may engage with a user using a data visualizer 216 of the apparatus 200, which in turn leverages other elements of the apparatus 200 and topic modeling system 102. For instance, the data visualizer 216 may utilize the input-output circuitry 208 of the apparatus 200 to engage directly with a user or leveraging communications circuitry 206 to engage via communications network 108 with a user who is utilizing a remote client device 112. Other example implementations are contemplated herein where the topic modeling system 102 itself is not the device with which a user engages to visualize the output of a topic model, but rather the user instead engages with a separate device while the topic modeling system 102 is used solely for prototyping topic models.

Turing to operation 1102 of FIG. 11, the apparatus 200 includes means for prototyping a topic model based on a set of documents. The specific components and operations for prototyping a topic model are omitted here for brevity and such operations are discussed in greater detail above in connection with FIGS. 4-10.

As shown by operation 1104, the apparatus 200 includes means, such as data visualizer 216 or the like, for exporting data from the prototyped topic model. As with operation 1102, the specific operations for exporting a topic model are omitted here for brevity, and exporting of data relating to the topic model may be performed in accordance with the prior description set forth in connection with operation 410 of FIG. 4, and FIGS. 9 and/or 10.

As shown by operation 1106, the apparatus 200 includes means, such as data visualizer 216 or the like, for generating a graphical user interface to be presented to a user, the graphical user interface depicting a set of discrete graphical elements relating to the prototyped topic. As discussed in connection with FIG. 3 above, these discrete graphical elements may comprise any of a number of visualizations, such as a topic bubble, time series data, a word cloud, tables of metadata relating to one or more documents in the set of documents from which the topic model was prototyped, or the like. Some examples for how a user may engage with these graphical elements are described below in connection with operation 1110.

As shown by operation 1108, the apparatus 200 includes means, such as data visualizer 216 or the like, for populating the set of discrete graphical elements using the exported data to produce a set of visualizations about the set of documents. It will be understood that although operations 1104, 1106, and 1008 are described as three distinct operations, this description assumes that data must be exported and separately visualized. However, in implementations where visualizations are created directly from the objects created during topic modeling prototyping operations, operations 1104, 1106, and 1108 may reduce into two operations of generating a set of visualization and then presenting them by the GUI.

As shown by optional operation 1110, the apparatus 200 may include means, such as data visualizer 216, or the like, for receiving user input regarding the set of discrete graphical elements. This operation is optional insofar as the data visualizer 216 may never, in fact, receive user input from the user regarding the set of discrete graphical elements. In fact, in some embodiments, it may not be necessary for the data visualizer 216 to present any user-adjustable components, in which case the user may not be afforded the ability to provide user input regarding the set of discrete graphical elements. But where such input is warranted, user-adjustable components may be provided and then the user may engage with them to alter the visualization presented to the user.

In one such example, the set of discrete graphical elements presented by the data visualizer may include a topic bubble. As described previously in connection with graphical element 302 of FIG. 3, a topic bubble may visually illustrate a set of icons corresponding to topics identified by the prototyped topic model. The size of each icon in the set of icons shown in the topic bubble may be directly related to a rank-ordered prevalence of the corresponding topic in the set of documents. In addition to presenting the topic bubble, the data visualizer 216 may also present a user-adjustable slider (such as slider 310 shown in FIG. 3) via the graphical user interface that can be used to select the total number of icons included in the topic bubble visualization. A default number of icons can be presented initially, but upon receipt of user adjustment, the visualization may be updated accordingly. For instance, the user input regarding the set of discrete graphical elements received by the data visualizer 216 may include user input indicating manipulation of the user-adjustable slider in a manner that indicates an intent to change the number of topics to visualize in the topic bubble (e.g., by the user employing an input device such as a mouse or keyboard commands to slide the slider to the left (reducing the number of topics to display) or the right (increasing the number of topics to display). In response to the user input, the data visualizer 216 may determine a new number of icons to present in the topic bubble, following which the procedure may return to operation 1108 above to re-populate the visualizations based on the user input (e.g., by modifying the topic bubble to include the new number of icons, and modifying the user-adjustable slider to display the new number of icons).

In addition to presenting the topic bubble, the data visualizer 216 may also allow user manipulation of the topic bubble itself. To this end, the data visualizer 216 may receive user input indicating selection of a particular icon in the topic bubble. In response to such input, the procedure may return to operation 1108 above to re-populate the visualizations based on the user input (e.g., by presenting a pop-up window via the graphical user interface, the pop-up window displaying a predefined number of the most frequent topic words in the topic corresponding to the selected icon modifying the topic bubble to include the new number of icons, and by modifying the user-adjustable slider to display the new number of icons). Similarly, although the predefined number of words may comprise a default number of words, this number can potentially be adjustable by the user via a user-adjustable menu. For instance, the data visualizer 216 may present a user-adjustable menu (such as pull-down menu 312 shown in FIG. 3) via the graphical user interface, the user-adjustable menu displaying the number of topic words that will be displayed in pop-up windows relating to the topic bubble (which may initially show the default number of words). The user input received by the data visualizer 216 regarding the set of discrete graphical elements may include user input indicating manipulation of the user-adjustable menu to change the number of topic words to be included in pop-up windows to visualize in the topic bubble. If such user input is provided, the data visualizer 216 may change the predefined number of words to be displayed in pop-up windows relating to the topic bubble to correspond to the user-selected number of words, and the procedure may return to operation 1108 above to re-populate the visualizations based on the user input (e.g., by updating the depiction of the user-adjustable menu such that it illustrates the user selection).

In another example, the set of discrete graphical elements presented by the data visualizer may include a time series chart visually illustrating a prevalence of a particular topic identified across the set of documents used to prototype the topic model, such as the graphical element 306 described previously in connection with FIG. 3. When the data visualizer 216 receives user input indicating selection of a particular icon in the topic bubble, the procedure may return to operation 1108 above to re-populate the visualizations based on the user input, in this case by re-populating the time series chart such that it depicts time series data relating to the selected topic.

As yet another example, the set of discrete graphical elements presented by the data visualizer may include a word cloud such as graphical element 308 described previously in connection with FIG. 3. The word cloud may visually illustrate prevalence of words in the set of documents, wherein a size of each word in the word cloud illustrates the prevalence of that word in the set of documents.

Finally, the set of discrete graphical elements presented by the data visualizer may include a table illustrating metadata regarding particular documents in the set of documents, such as graphical element 316 described previously in connection with FIG. 3.

Altogether, the user may repeatedly manipulate the visualizations, and by doing so may cause the procedure to cycle through operations 1108 and 1110 any number of times.

Optional operations 1112 and 1114 illustrate situations where a user utilizes the data visualization features of the topic modeling system 102 to iteratively prototype a topic model for a particular set of documents. These operations are marked as optional because iterative prototyping is not required to utilize the visualization features set forth in various embodiments described herein.

As shown by optional operation 1112, the apparatus 200 may include means, such as data manipulation engine 210, feature extraction engine 212, autonomous model generator 214, or the like, for receiving user input for customizing a new topic model prototype. It will be understood that this user input could take the form of new instructions regarding any phase of the topic modeling prototyping process. For instance, the user input may indicate changes to the manner by which data should be ingested during the topic model prototyping process (e.g., by narrowing or expanding the data sources to utilize, by establishing new data validation or screening requirements, or the like). Customization of data ingestion is described above in connection with operation 402 of FIG. 4. Similarly, the user input may indicate changes to the manner by which ingested data should be pre-processed (e.g., by customizing the set of pre-processing operations to apply to ingested data), as has been described previously in connection with operation 404 of FIG. 4. User input may be received for either of these purposes by data manipulation engine 210. In some embodiments, the user input may indicate changes in the feature extraction functionality described previously in connection with operation 406 of FIG. 4 (such as by specifying a particular vectorization operation or particular additional tokenization steps to be performed after pre-processing of data), in which case such user input may be received by the feature extraction engine 212 of the apparatus 200. Finally, where the user input is intended to modify the nature of the topic model generation operation 408 of FIG. 4 (e.g., by specifying changes to hyperparameters, topic modeling techniques, or the like), the autonomous model generator 214 may receive such user input.

Upon receipt the of user input for customizing a new topic model prototype, operation 1114 illustrates that the apparatus 200 may include means for prototyping a new topic model based on such user input. Once again, the operations for prototyping a topic model have been described previously in connection with FIGS. 4-11 and for brevity are not described again here. In any event, following generating of a new topic model based on the user input generated based on data visualization, the procedure may return to operation 1104 above so that the user may visualize the newly prototyped topic model to understand how the user's changes affect the quality of a prototyped topic model. This sequence may continue indefinitely until the user is satisfied with the quality of the topic model prototyped.

As described above, example embodiments provide methods and apparatuses for utilizing topic model visualization, which enhance user engagement with a prototyped topic model. Through the interactive visualization operations described above, a user may easily identify ways to develop a better topic model (e.g., through selection of new refinements in data ingestion, pre-processing, feature extraction, topic modeling, or the like). Alternatively, a user may simply utilize the visualizations to more easily understand the insight provided by a topic model so the user can leverage that insight to enhance business operations; in this regard, the visualization operations described in connection with FIG. 11 convert topic model output into actionable data-driven insights that can systematically enhance the quality of user decision-making. Specifically, by simplifying and automating visualization functionality that has historically required significant human effort and manual labor to produce, these operations unlock new uses for topic models that have heretofore been unavailable to those without the technical sophistication to develop bespoke visualizations, which in turn enables the application of topic models by a large audience in situations where time is of the essence.

As these examples all illustrate, example embodiments contemplated herein provide technical solutions that solve real-world problems faced by users desiring to exploit topic models in real-world situations. And while topic modeling has been an area of interest for decades, the recently exploding amount of data made available by recently emerging technology today has made the use of topic modeling significantly more important to those seeking holistic understanding of large sets of documents, particularly where consistency of process is important, time is of the essence, and in domains where individuals having deep expertise in machine learning are not readily available. Accordingly, the present disclosure provides new tools for solving these various technical hurdles that historically were not available, and example embodiments described herein thus represent technical solutions to these real-world technical challenges.

FIGS. 4-11 illustrate flowcharts describing sets of operations performed by apparatuses, methods, and computer program products according to various example embodiments. It will be understood that each block of the flowcharts, and combinations of blocks in the flowcharts, may be implemented by various means, embodied as hardware, firmware, circuitry, and/or other devices associated with execution of software including one or more software instructions. For example, one or more of the operations described above may be embodied by software instructions. In this regard, the software instructions which embody the procedures described above may be stored by a memory of an apparatus employing an embodiment of the present invention and executed by a processor of that apparatus. As will be appreciated, any such software instructions may be loaded onto a computing device or other programmable apparatus (e.g., hardware) to produce a machine, such that the resulting computing device or other programmable apparatus implements the functions specified in the flowchart blocks. These software instructions may also be stored in a computer-readable memory that may direct a computing device or other programmable apparatus to function in a particular manner, such that the software instructions stored in the computer-readable memory produce an article of manufacture, the execution of which implements the functions specified in the flowchart blocks. The software instructions may also be loaded onto a computing device or other programmable apparatus to cause a series of operations to be performed on the computing device or other programmable apparatus to produce a computer-implemented process such that the software instructions executed on the computing device or other programmable apparatus provide operations for implementing the functions specified in the flowchart blocks.

The flowchart blocks support combinations of means for performing the specified functions and combinations of operations for performing the specified functions. It will be understood that one or more blocks of the flowcharts, and combinations of blocks in the flowcharts, can be implemented by special purpose hardware-based computing devices which perform the specified functions, or combinations of special purpose hardware and software instructions.

In some embodiments, some of the operations above may be modified or further amplified. Furthermore, in some embodiments, additional optional operations may be included. Modifications, amplifications, or additions to the operations above may be performed in any order and in any combination.

CONCLUSION

Many modifications and other embodiments of the inventions set forth herein will come to mind to one skilled in the art to which these inventions pertain having the benefit of the teachings presented in the foregoing descriptions and the associated drawings. Therefore, it is to be understood that the inventions are not to be limited to the specific embodiments disclosed and that modifications and other embodiments are intended to be included within the scope of the appended claims. Moreover, although the foregoing descriptions and the associated drawings describe example embodiments in the context of certain example combinations of elements and/or functions, it should be appreciated that different combinations of elements and/or functions may be provided by alternative embodiments without departing from the scope of the appended claims. In this regard, for example, different combinations of elements and/or functions than those explicitly described above are also contemplated as may be set forth in some of the appended claims. Although specific terms are employed herein, they are used in a generic and descriptive sense only and not for purposes of limitation.

What is claimed is:

1. A method for automated topic model prototyping, the method comprising:
    ingesting, by a data manipulation engine, source data from a set of data sources;
    pre-processing the source data by the data manipulation engine to produce pre-processed data;
    transforming, by a feature extraction engine, the pre-processed data into a set of numeric representations of the pre-processed data;
    automatically generating, by an autonomous model generator, a trained topic model using the set of numeric representations, wherein the trained topic model is used to provide output data; and
    in response to providing the output data from the trained topic model:
        receiving, by communications circuitry, an evaluation of the trained topic model from a user, and
        prototyping, by the autonomous model generator and based on the evaluation, a new trained topic model.

2. The method of claim 1, further comprising:
    generating a set of output data using the trained topic model; and
    exporting the set of output data.

3. The method of claim 1, wherein ingesting the source data includes:
    identifying, by the data manipulation engine, a set of data conditions relating to the set of data sources; and
    collecting, by the data manipulation engine, data from the set of data sources satisfying the set of data conditions relating to the set of data sources,
    wherein the source data comprises the collected data.

4. The method of claim 3, wherein the set of data conditions includes at least one conditional statements specifying a feature of a data element that is either true or false.

5. The method of claim 1, wherein pre-processing the source data includes:
    applying, by the data manipulation engine, a series of data transformations to the source data.

6. The method of claim 1, wherein transforming the pre-processed data into the set of numeric representations of the pre-processed data includes:
    applying a term frequency/word counts methodology to the pre-processed data;
    applying a term frequency/inverse document frequency (TF-IDF) methodology to the pre-processed data;
    applying a word embedding methodology to the pre-processed data; or
    applying a user-specified methodology for transforming the pre-processed data into the set of numeric representations of the pre-processed data.

7. The method of claim 1, wherein transforming the pre-processed data into the set of numeric representations of the pre-processed data includes:
    performing, by the feature extraction engine, a first feature extraction operation on the pre-processed data to generate a set of tokens; and
    performing, by the feature extraction engine, a second feature extraction operation on the set of tokens to generate the set of numeric representations of the pre-processed data.

8. The method of claim 1, wherein generating the trained topic model includes:
    training, by the autonomous model generator, a set of topic models using the set of numeric representations to produce a set of trained topic models; and
    selecting, by the autonomous model generator, the trained topic model from the set of trained topic models.

9. The method of claim 8, wherein generating the trained topic model further includes:
    identifying, by a model evaluation component of the autonomous model generator, a metric to use for evaluation of the set of trained topic models; and
    calculating, by the model evaluation component of the autonomous model generator and based on the identified metric, a metric score for each trained topic model in the set of trained topic models,
    wherein selection of the trained topic model from the set of topic models is based on the metric scores for the set of trained topic models.

10. The method of claim 9, wherein the identified metric comprises one of perplexity, log-likelihood, intra-topic similarity, or coherence.

11. The method of claim 1, wherein prototyping the new trained topic model further comprises:
    receiving, by the communications circuitry and based on a comparison between new output data provided by the new trained topic model and the output data provided by the trained topic model, an evaluation of the new trained topic model from the user; and
    prototyping, by the autonomous model generator and based on the comparison, the new trained topic model.

12. A topic modeling system for automated prototyping of a topic model, the topic modeling system comprising:
    a data manipulation engine configured to:
        ingest source data from a set of data sources, and
        pre-process the source data to produce pre-processed data;
    a feature extraction engine configured to:
        transform the pre-processed data into a set of numeric representations of the pre-processed data;
    an autonomous model generator configured to automatically generate a trained topic model using the set of numeric representations, wherein the trained topic model is used to provide output data; and
    communications circuitry configured to, in response to providing the output data from the trained topic model, receive an evaluation of the trained topic model from a user,
    wherein the autonomous model generator is further configured to prototype, based on the evaluation, a new trained topic model.

13. The topic modeling system of claim 12, further comprising a data visualizer configured to:

generate a set of output data using the trained topic model; and export the set of output data.

14. The topic modeling system of claim 12, wherein, to ingest the source data, the data manipulation engine is configured to:

identify a set of data conditions relating to the set of data sources; and collect data from the set of data sources satisfying the set of data conditions relating to the set of data sources, wherein the source data comprises the collected data.

15. The topic modeling system of claim 14, wherein the set of data conditions includes at least one conditional statements specifying a feature of a data element that is either true or false.

16. The topic modeling system of claim 12, wherein, to transform the pre-processed data into the set of numeric representations of the pre-processed data, the feature extraction engine is configured to:

apply a term frequency/word counts operation to the pre-processed data;

apply a term frequency/inverse document frequency (TF-IDF) methodology to the pre-processed data;

apply a word embedding methodology to the pre-processed data; or apply a user-specified methodology for transforming the pre-processed data into the set of numeric representations of the pre-processed data.

17. The topic modeling system of claim 12, wherein, to transform the pre-processed data into the set of numeric representations of the pre-processed data, the feature extraction engine is further configured to:

perform, by the feature extraction engine, a first feature extraction operation on the pre-processed data to generate a set of tokens; and perform, by the feature extraction engine, a second feature extraction operation on the set of tokens to generate the set of numeric representations of the pre-processed data.

18. The topic modeling system of claim 12, wherein, to generate the trained topic model, the autonomous model generator is configured to:

train a set of topic models using the set of numeric representations to produce a set of trained topic models; and select the trained topic model from the set of trained topic models.

19. The topic modeling system of claim 18, wherein, to generate the trained topic model, the autonomous model generator includes a model evaluation component configured to:

identify a metric to use for evaluation of the set of trained topic models; and calculate, based on the identified metric, a metric score for each trained topic model in the set of trained topic models, wherein the autonomous model generator is configured to select the trained topic model from the set of topic models based on the metric scores for the set of trained topic models.

20. A computer program product for automated prototyping of a topic model, the computer program product comprising at least one non-transitory computer-readable storage medium storing software instructions that, when executed, cause a topic modeling system to:

ingest source data from a set of data sources;

pre-process the source data to produce pre-processed data;

transform the pre-processed data into a set of numeric representations of the pre-processed data;

automatically generate a trained topic model using the set of numeric representations, wherein the trained topic model is used to provide output data; and in response to providing the output data from the trained topic model:

receive an evaluation of the trained topic model from a user, and prototype, based on the evaluation, a new trained topic model.

* * * * *